US009473476B2

(12) United States Patent
Raju et al.

(10) Patent No.: US 9,473,476 B2
(45) Date of Patent: Oct. 18, 2016

(54) PROGRAM GUIDE DATA MANAGEMENT FOR MEDIA CONTENT ACCESS SYSTEMS AND METHODS

(75) Inventors: Mukunda Raju, Irving, TX (US); Laxmi Patel, Irving, TX (US); Anita Mal James, Chennai (IN); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1849 days.

(21) Appl. No.: 11/871,663

(22) Filed: Oct. 12, 2007

(65) Prior Publication Data
US 2008/0256575 A1 Oct. 16, 2008

Related U.S. Application Data

(60) Provisional application No. 60/879,003, filed on Jan. 5, 2007.

(51) Int. Cl.
*H04N 5/445* (2011.01)
*G06F 3/00* (2006.01)
(Continued)

(52) U.S. Cl.
CPC ............ *H04L 63/08* (2013.01); *G06F 3/0482* (2013.01); *G06F 3/0487* (2013.01); *G06F 3/04817* (2013.01); *G06F 3/04842* (2013.01); *H04L 12/4625* (2013.01); *H04N 5/76* (2013.01); *H04N 5/765* (2013.01); *H04N 5/775* (2013.01);
(Continued)

(58) Field of Classification Search
CPC ..................... H04N 21/47214; H04N 21/433; H04N 21/482; H04N 5/44543; H04N 7/0887; G06F 3/04817; G06F 3/0482; G06F 3/04842; G06F 3/0487

USPC .......... 725/39, 54, 37, 43, 53; 709/229, 227; 707/747, 741
See application file for complete search history.

(56) References Cited

U.S. PATENT DOCUMENTS 6,173,330 B1 * 1/2001 Guo et al. ..................... 709/232
7,644,103 B2 * 1/2010 Smith et al. .................. 725/131
(Continued)

FOREIGN PATENT DOCUMENTS

GB      WO 95/10091    * 10/1994    ............ G06F 17/30

OTHER PUBLICATIONS

Microsoft ASP.net (A community forum for ASP.net developers) [online]. Discussion re: Removing the last character of a string on Nov. 8-9, 2005. Retrived from the Internet using URL <http://forums.asp.net/t/935205.aspx/1?Removing+the+last+character+of+a+string>.*

*Primary Examiner* — Brian T Pendleton
*Assistant Examiner* — Alan Luong

(57) ABSTRACT

An exemplary system includes a data loader and a data slicer. The data loader is configured to receive and process raw program guide data, and to store the processed program guide data in a data store, the processing including generating a unique program identifier for each program represented in the raw program guide data. The data slicer is configured to generate a program guide data configuration from the processed program guide data, the program guide data configuration including program guide data organized into a plurality of data structures based on categories of the program guide data. The plurality of data structures includes at least one channel data structure, at least one schedule data structure, at least one detailed program information data structure, and indices for use as references between different ones of the data structures.

26 Claims, 16 Drawing Sheets

(51) Int. Cl.

| | | |
|---|---|---|
| *G06F 13/00* | (2006.01) | |
| *H04L 29/06* | (2006.01) | |
| *H04L 12/46* | (2006.01) | |
| *H04N 5/76* | (2006.01) | |
| *H04N 5/765* | (2006.01) | |
| *H04N 5/775* | (2006.01) | |
| *H04N 7/173* | (2011.01) | |
| *H04N 21/433* | (2011.01) | |
| *H04N 21/482* | (2011.01) | |
| *H04N 21/84* | (2011.01) | |
| *G06F 3/0481* | (2013.01) | |
| *G06F 3/0482* | (2013.01) | |
| *G06F 3/0484* | (2013.01) | |
| *G06F 3/0487* | (2013.01) | |
| *H04N 5/781* | (2006.01) | |
| *H04N 5/85* | (2006.01) | |
| *H04N 5/907* | (2006.01) | |

(52) U.S. Cl.
CPC ........ *H04N7/17318* (2013.01); *H04N 21/433* (2013.01); *H04N 21/482* (2013.01); *H04N 21/84* (2013.01); *H04N 5/781* (2013.01); *H04N 5/85* (2013.01); *H04N 5/907* (2013.01)

(56) References Cited

U.S. PATENT DOCUMENTS

| | | | |
|---|---|---|---|
| 7,885,963 B2* | 2/2011 | Sanders | 707/750 |
| 2003/0145085 A1* | 7/2003 | Baldwin | H04L 29/06 709/225 |
| 2003/0149979 A1* | 8/2003 | Baldwin | H04N 7/165 725/39 |
| 2003/0208761 A1* | 11/2003 | Wasserman | G06F 17/30067 725/53 |
| 2004/0003403 A1* | 1/2004 | Marsh | 725/53 |
| 2004/0123317 A1* | 6/2004 | Ozawa | H04N 5/44543 725/39 |
| 2004/0128683 A1* | 7/2004 | Ko | H04N 5/44543 725/39 |
| 2004/0158876 A1* | 8/2004 | Lee | H04N 5/44543 725/136 |
| 2004/0187150 A1* | 9/2004 | Gonder | H04N 21/235 725/43 |
| 2004/0196906 A1* | 10/2004 | Gordon | H04N 5/4401 375/240.12 |
| 2005/0044134 A1* | 2/2005 | Krueger et al. | 709/201 |
| 2006/0088276 A1* | 4/2006 | Cho | H04H 60/73 386/230 |
| 2006/0092055 A1* | 5/2006 | Baldwin et al. | 341/87 |
| 2008/0114859 A1* | 5/2008 | Orzen | H04H 20/24 709/218 |
| 2008/0162523 A1* | 7/2008 | Kraus et al. | 707/101 |

* cited by examiner

PROGRAM GUIDE DATA MANAGEMENT FOR MEDIA CONTENT ACCESS SYSTEMS AND METHODS

RELATED APPLICATIONS

The present application claims priority under 35 U.S.C. §119(e) to U.S. Provisional Patent Application No. 60/879,003 by Brian Roberts et al., filed on Jan. 5, 2007, and entitled USER INTERFACE FUNCTIONS FOR MEDIA CONTENT ACCESS SYSTEMS AND METHODS, the contents of which are hereby incorporated by reference in their entirety.

BACKGROUND INFORMATION

The advent of computers, the Internet, and other advances in the digital realm of consumer electronics have resulted in a great variety of programming, recording, and viewing options for users who view media content such as television programs. In implementing such options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is usually configured to provide users with access to a large number and variety of media content choices provided by a subscriber television system. For example, a user may choose to experience a variety of broadcast television programs, pay-per-view services, video-on-demand programming, and audio programming via an STB.

To assist a user with navigating the variety of media content choices provided by the subscriber television system, an STB typically includes a program guide application, which is configured to present information descriptive of media content to the user. For example, a typical program guide may provide scheduling and/or ordering information related to the media content choices.

However, the capabilities of conventional program guide applications are generally limited because of the inherent restrictions placed on traditional STBs. Typically, traditional STBs are designed to have minimal memory and processing capabilities. While this helps keep consumer costs down, it also restricts the amount of information that can be stored and processed by an STB. The restriction is especially problematic for conventional program guide applications that process program guide data. This problem is magnified in subscriber television systems that provide large amounts of content choices and program guide data. Consequently, the quality of traditional program guide user interfaces has been sacrificed.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION

Figure 1:
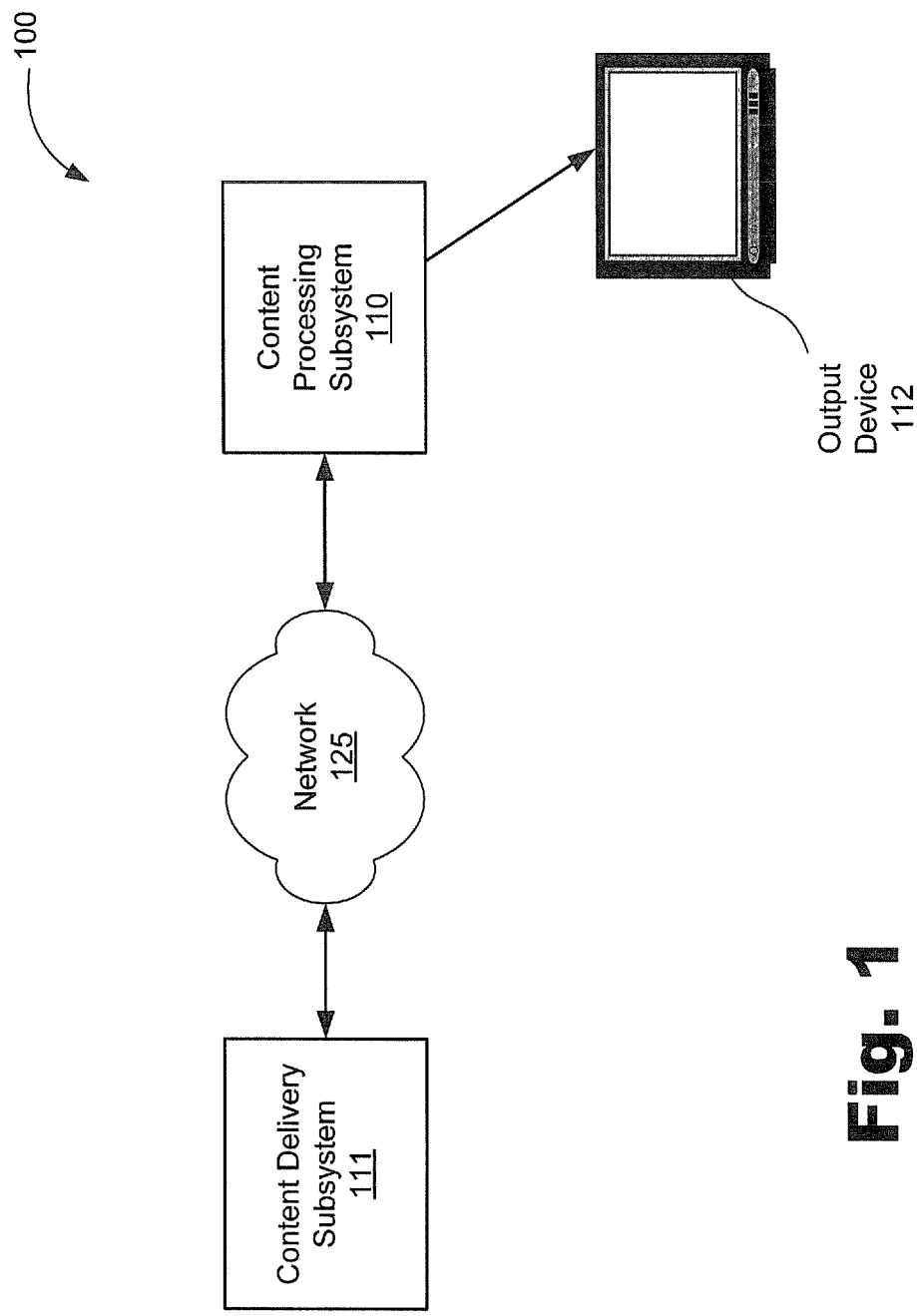
FIG. 1 illustrates an exemplary media content access system.

Exemplary systems and methods for managing program guide data are described herein. Management of program guide data may include generating specific configurations of program guide data that are designed to conserve memory and processing resources of content processing devices such as set-top boxes ("STBs"), for example. The configurations of program guide data may be used to efficiently create and provide rich, high-quality program guide user interfaces even when memory and processing resources are limited.

In certain implementations, a data loader may be configured to receive and process raw program guide data such as may be provided by a third-party service. Data load processing may include assigning one or more unique identifiers for certain data elements included in the raw program guide data. For example, a unique program identifier may be assigned for each program (e.g., television program) represented in the raw program guide data, a unique series identifier may be assigned for each program series (e.g., a series of television program episodes) represented in the raw program guide data, a unique station identifier may be assigned for each station (e.g., NBC) represented in the raw program guide data. Unique identifiers may be generated in accordance with any of the principles described below, which may produce unique identifiers that are particularly effective for reducing or even eliminating redundancies that may otherwise exist in program guide data. An exemplary data loading process will be described below.

In certain implementations, a data slicer may be configured to access and process program guide data, including the program data processed by the data loader. Data slicer processing may include generating a configuration of program guide data structures ("program guide data configuration") that is designed to help conserve memory and processing resources. A generated configuration may be provided to and used by a content processing subsystem to efficiently generate a program guide user interface based on at least a subset of the program guide data included in the configuration. As described below, an exemplary configuration of program guide data structures may be configured to support efficient data retrieval operations, including operations having a constant and/or O(logN) maximum order of complexity. For example, data retrieval operations may utilize array indexing between different data structures included in a program guide data configuration.

In certain implementations, a program guide data configuration may include program guide data organized into a plurality of data structures based on categories of the program guide data. The program guide data may be organized in a manner that conserves memory and processing resources, including by minimizing redundant data storage and supporting efficient data retrieval operations. The program guide data configuration may include at least one channel data structure, at least one schedule data structure, at least one detailed program information data structure, and indices (e.g., data address offsets and/or index values) for use as references between different ones of the data structures. Exemplary channel data structures, schedule data structures, detailed program information data structures, and relationships between the data structures will be described further below.

Data structures in an exemplary program guide data configuration may be organized into separate groups, which may include discrete electronic files. For example, the data structures may be selectively organized into a channel file, a lookup file, and at least one schedule file. In certain implementations, the channel file may include a plurality of channel data structures, the lookup file may include a first subset of a plurality of detailed program information data structures, and the schedule file may include a plurality of schedule data structures and a second subset of the plurality of detailed program information data structures. Exemplary channel, lookup, and schedule data groups, as well as the data and data structures included therein will be described further below.

The data structures in an exemplary program guide data configuration may be sorted by the data slicer. For example, channel data structures may be sorted by channel identifiers, schedule data structures may be sorted by channel indices and program start times, and detailed program information data structures may be sorted by unique identifiers (e.g., unique program identifiers), including any of the unique identifiers generated by the data loader.

An exemplary configuration of program guide data structures may include compressed and/or uncompressed strings of data. In certain implementations, a configuration of program guide data structures includes both compressed and uncompressed string data. Strings that are frequently requested and used may be stored uncompressed in the configuration while strings that are requested relatively less frequently may be compressed and stored in the configuration. Such a division between compressed and uncompressed string data can conserve processing and memory resources in certain applications. Data request frequencies and/or other criteria may be obtained from program guide data usage patterns (e.g., historical data) and used to selectively compress program guide string data.

String data in a configuration of program guide data structures may be compressed and decompressed individually. This can help conserve memory and processing resources. For example, a particular data string being requested can be decompressed without having to decompress or otherwise parse other data strings.

In an exemplary configuration of program guide data structures, string data may be stored separately from other program guide data. For example, string data may be stored in a particular data structure, and related non-string data may be stored in another data structure that has references (e.g., data address offsets) to the string data structure. Such a configuration can facilitate efficient retrieval of string data.

These and other elements and benefits of exemplary systems and methods for managing program guide data will now be described in relation to FIGS. 1-14.

Turning now to the drawings, FIG. 1 illustrates an exemplary media content access system 100. As shown in FIG. 1, media content access system 100 may include a content processing subsystem 110 and a content delivery subsystem 111 configured to communicate with one another by way of a network 125. Network 125 may include one or more networks, including, but not limited to the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network), an optical fiber network, a synchronous optical network ("SONET"), an Internet Protocol ("IP") based network, any other suitable network, and any combination of these networks. In certain implementations network 125 includes "fiber-to-the-premises" transmission media, which can provide significant bandwidth and speed capacities for transmission of content between the content delivery subsystem 111 and the content processing subsystem 110.

The content processing subsystem 110 and content delivery subsystem 111 may communicate using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), optical transmission protocols, socket connections, Ethernet, routers, servers, network interfaces, switches, gateways, multiplexers, demultiplexers, modulators, demodulators, modems, optical network terminals, optical line terminals, and other suitable communications networks, devices protocols, and technologies.

Content processing subsystem 110 may be configured to receive one or more data streams from content delivery subsystem 111. A data stream may carry any content that can be electronically transmitted between the content delivery subsystem 111 and the content processing subsystem 110. As used herein, the term "content" broadly refers to any electronically represented information (e.g., data) that can be processed by the content delivery subsystem 111 and/or the content processing subsystem 110, including, but not limited to, media content, program guide data, and resource data. Program guide data may be transmitted between the content processing subsystem 110 and the content delivery subsystem 111 by out-of-band, in-band, or a combination of out-of-band and in-band communications.

The content processing subsystem 110 may be configured to process the data stream provided by the content delivery subsystem 111 and to provide a signal to an output device 112 such that the output device 112 may present content included in the data stream. In this manner, the content processing subsystem 110 may cause content to be presented for experiencing by a user of the content processing subsystem 110.

The output device 112 may include one or more devices configured to present (e.g., display, play, or otherwise provide) the content (e.g., media content and/or program guide data) for experiencing by a user. The output device 112 may include, but is not limited to, a display (e.g., a display screen), a television, computer monitor, handheld device, speaker, or any other device configured to present content. As is well known, the output device 112 may receive and process output signals from the content processing subsystem 110 such that content of the output signals may be presented for experiencing by the user.

While FIG. 1 illustrates the output device 112 as being a device separate from and communicatively coupled to the content processing subsystem 110, this is exemplary only and not limiting. In other implementations, the output device 112 and the content processing subsystem 110 may be integrated into one physical device. For example, the output device 112 may include a display (e.g., a display screen) integrated in the content processing subsystem 110.

While an exemplary media content access system 100 is shown in FIG. 1, the exemplary components illustrated in FIG. 1 are not intended to be limiting. Additional or alternative components and/or implementations may be used. Media content access system 100 may take many different forms and include multiple and/or alternate components and facilities. For example, FIG. 1 illustrates only a single content processing subsystem 110. However, multiple content processing subsystems 110 may be configured to communicate with the content delivery subsystem 111 over network 125. Additionally or alternatively, system 100 may include multiple content delivery subsystem 111 providing content to different groups of content processing subsystems 110. Further, multiple content delivery subsystems 111 may be configured to provide redundancy and therefore increased reliability.

In certain implementations, the system 100 may include any computer hardware and/or instructions (e.g., software programs), or combinations of software and hardware, configured to perform the processes described herein. In particular, it should be understood that system 100 may be implemented on multiple physical computing devices. Components of system 100 may be implemented on one or more than one physical computing device. Accordingly, system 100 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in FIG. 1 are not intended to be limiting. Indeed, additional or alternative components and/or implementations may be used. Various components of the system 100 will now be described in additional detail.

Figure 2:
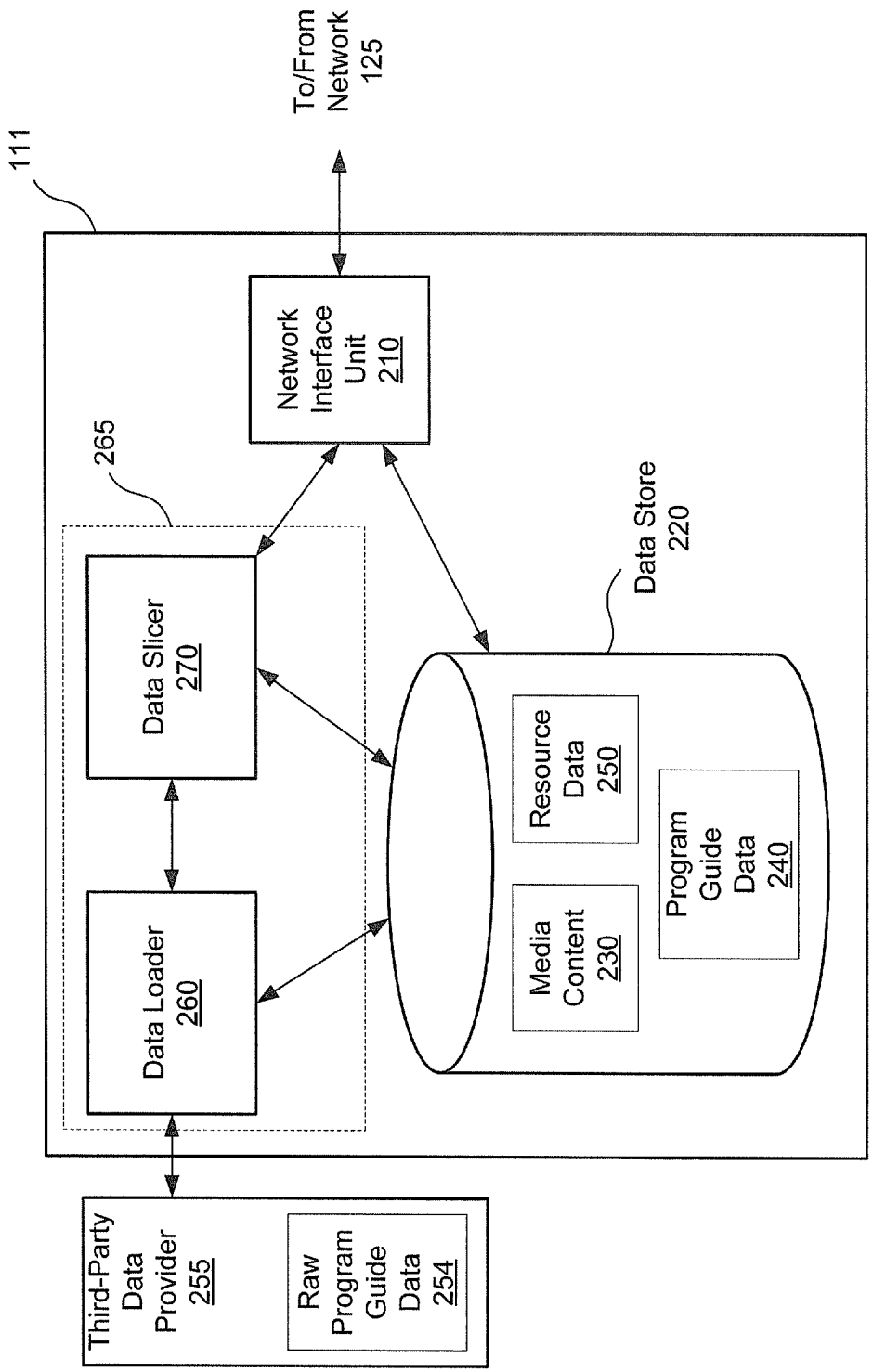
FIG. 2 illustrates an exemplary content delivery subsystem.

FIG. 2 illustrates an exemplary content delivery subsystem 111. As shown in FIG. 2, content delivery subsystem 111 may include a network interface unit 210. Network interface unit 210 may include one or more devices capable of communicating with the content processing subsystem 110 via network 125, including, but not limited to, one or more servers, routers, etc. In particular, the network interface unit 210 may be configured to provide content (e.g., data streams carrying content) to the content processing subsystem 110 over the network 125. The content delivery subsystem 111 may be implemented at a head-end unit (e.g., a super and/or local head-end unit), base station, central office, video hub office ("VHO") video serving offices ("VSOs"), network node, other suitable locations, or at any combination of one or more of these locations.

The network interface unit 210 may be communicatively coupled to and configured to communicate with a data store 220, including requesting and accessing content from the data store 220. Accordingly, content stored in data store 220 can be made available over the network 125 by the network interface unit 210. The content may be provided at any suitable time, including in response to a request from the content processing subsystem 110, at a predefined time or event, and periodically. The content may be provided in any suitable manner, including using in-band, out-of-band, or a combination of in-band and out-of-band communications, as mentioned above. Examples of the content delivery subsystem 111 delivering content to the content processing subsystem 110 are described further below.

Data store 220 may include one or more data storage mediums, devices, or configurations and may employ any type, form, and combination of storage media, including hard disk drives, read-only memory, caches, databases, optical media, and random access memory. Data store 220 may include any known technologies useful for storing, updating, modifying, accessing, retrieving, and deleting content (e.g., program guide data). In the example shown in FIG. 2, the data store 220 includes media content 230, program guide data 240, and resource data 250. Of course, this is illustrative only. Data store 220 may additionally or alternatively store other content.

Media content 230 may include data representative of media that can be experienced by a user, including, but not limited to, any television program, on-demand program, pay-per-view program, broadcast media program, video-on-demand program, independently-produced media, studio-produced media, video, multimedia, movie, song, photograph, audio programming, or any segment, portion, component, or combination of these or other forms of media that may be presented to and experienced (e.g., viewed) by a user. As used herein, the term "program" broadly refers to any instance or component of media content 230, including any of those listed above.

Program guide data 240 may include any data that may be useful for generating and/or that may be included in a program guide user interface. Program guide data 240 may include, but is not limited to, data related to (e.g., descriptive of) media content 230 (e.g., media content metadata), program data, data descriptive of media content ordering information, data related to stations providing media content (i.e., station data), data related to channels used for transmission of media content (i.e., channel data), data related to scheduling of media content such as broadcast times and channels (i.e., schedule data), media ratings information, credits, casts, reviews, episode information, series information, show information, pay-per-view information, and any other information associated with media content. Exemplary contents, categorizations, and configurations of the program guide data 240 will be described further below.

Resource data 250 may include any data that can be accessed and utilized by applications running on the content processing subsystem 110, including, but not limited to, configuration files, images (e.g., bitmaps), graphics, templates, and library files. By way of an example, the resource data 250 may include images (e.g., channel and/or station logos) that can be used by a program guide application running on the content processing subsystem 110 to generate a program guide user interface.

The content delivery subsystem 111 may receive the content stored in data store 220 from any suitable source, including one or more internal and/or external sources. In certain implementations, for example, program guide data 240 in a raw form (i.e., raw program guide data 254) may be received from a third-party data provider 255, processed, and stored in data store 220 as program guide data 240. The third-party data provider 255 may include any suitable external source of data, including a provider of program guide information such as FYI Television, Inc. of Grand Prairie, Tex. or Tribune Media Services of Chicago, Ill. The content delivery subsystem 111 and the third-party data provider 255 may communicate using any suitable communication technologies.

The raw program guide data 254 may include any of the information that may be included in program guide data 240, as described above. However, the raw program guide data 254 may be in raw form. For example, the raw program guide data 254 may be defined in accordance with a format or data schema used by the third-party data provider 255.

As shown in FIG. 2, the content delivery subsystem 111 may include a data loader 260 configured to communicate with the third-party data provider 255, including receiving raw program guide data 254 from the third-party data provider 255. The data loader 260 may also be configured to communicate with the data store 220. Accordingly, the data loader 260 may be configured to receive and process the raw program guide data 254 and store the processed data in data store 220 as the program guide data 240.

The content delivery subsystem 110 may also include a data slicer 270 configured to communicate with the data loader 260, data store 220, and network interface unit 210. As will be described in detail further below, the data slicer 270 may process the program guide data 240, including generating one or more optimized configuration of the program guide data 240 that can help conserve both memory and processing resources of the content processing subsystem 110. A generated configuration of program guide data 240, examples of which will be described below, may be provided to the content processing subsystem 110 via the network interface unit 210 and network 125. As will also be described below, the content processing subsystem 110 may be configured to utilize the received program guide data configuration for generating a program guide user interface.

More generally, a data preprocessor 265 includes the functions of both data loader 260 and data slicer 270. Data preprocessor 265 may be a single unit that performs the functions of both the data load and the data slicer and interacts with the data store 220, network interface unit 210 and third party data provider 255. Alternatively, data preprocessor 265 may be more than one unit including both the data loader 260 and the data slicer 270.

Figure 3:
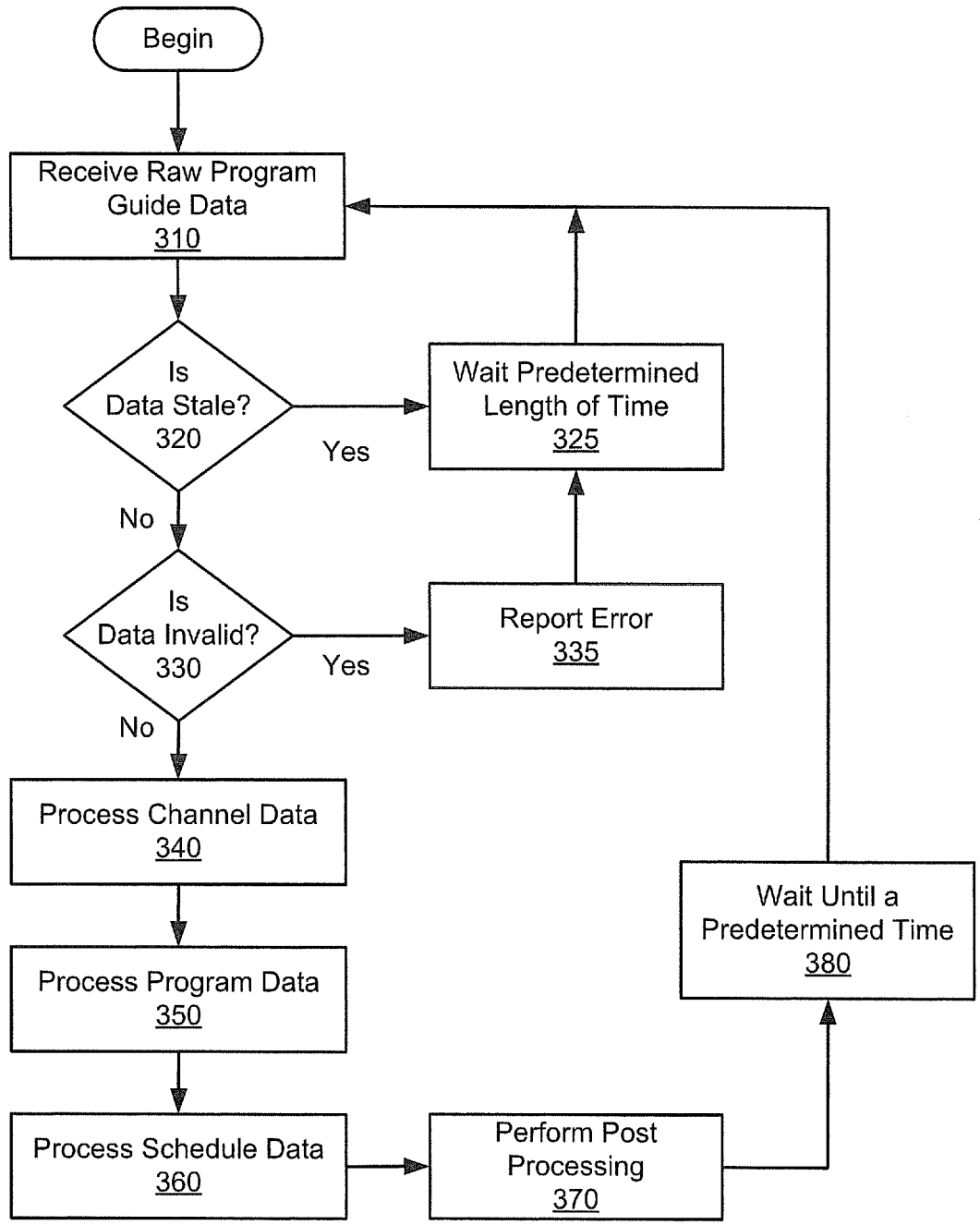
FIG. 3 illustrates an exemplary method of loading raw program guide data.

FIG. 3 illustrates an exemplary method of loading program guide data 240. While FIG. 3 illustrates exemplary steps according to one implementation, other implementations may omit, add to, reorder, and/or modify any of the steps shown in FIG. 3. The data loader 260 may be configured to perform any of the steps of the method illustrated in FIG. 3.

In step 310, raw program guide data 254 is received. The raw program guide data 254 may be received from any of the data sources described above, including the third-party data provider 255.

After the raw program guide data is received, it may be verified. FIG. 3 illustrates exemplary verification steps 320 and 330. Of course, other implementations may utilize other criteria for verifying the raw program guide data 254. In step 320, it is determined whether the received raw program guide data 254 is stale (i.e., outdated). Any suitable criterion or criteria may be used to determine whether the data is stale. In certain implementations, for example, the data loader 260 may verify whether one or more timestamps associated with the received raw program guide data 254 are correct compared to a reference clock. Alternatively or additionally, step 320 may include the data loader 260 verifying whether the received raw program guide data 254 includes schedule data beginning at an appropriate start time (e.g., a predefined time (midnight) of the current day).

If it is determined in step 320 that the received raw program guide data 254 is stale, processing moves to step 325. In step 325, the data loader 260 waits for a predetermined length of time (e.g., sixty minutes) before returning processing to step 310 for receipt of potentially more up-to-date raw program guide data 254.

On the other hand, if it is determined in step 320 that the received raw program guide data 254 is not stale, processing moves from step 320 to step 330. In step 330, it is determined whether the received raw program guide data 254 is invalid. Any suitable criterion or criteria may be used to determine whether the data is invalid. In certain implementations, for example, the data loader 260 may verify that all received data files in the raw program guide data 254 include data (i.e., are not empty). Alternatively or additionally, step 330 may include the data loader 260 verifying that the raw program guide data 254 includes schedule data for all channels and/or that the raw program guide data 254 includes metadata for all programs listed in the raw program guide data 254. In other words, the raw program guide data 254 may be checked for errors such as missing station, program, and schedule data, for example. An automatic verification of data generally helps improve the quality of the data that may be presented to a user of the content processing subsystem 110 as part of a program guide user interface.

If it is determined in step 330 that the received raw program guide data 254 is invalid, processing moves to step 335. In step 335, the data loader 260 reports an error. The error may be reported to the source of the raw program guide data 254 and/or to any potentially interested party. Processing then moves from step 335 to step 325, which may be performed as described above.

On the other hand, if it is determined in step 330 that the received raw program guide data 254 is valid, processing moves from step 330 to step 340. In step 340, channel data included in the raw program guide data 254 is processed In step 350, program data included in the raw program guide data 254 is processed. In step 360, schedule data included in the raw program guide data 254 is processed. In step 370, post processing is performed. In step 380, the data loader 260 waits until a predetermined time (e.g., midnight each day) before returning processing to step 310 for receipt of new raw program guide data 254.

FIGS. 4-7 illustrate exemplary steps for processing channel data (step 340 of FIG. 3), processing program data (step 350 of FIG. 3), processing schedule data (step 360 of FIG. 3), and performing post processing operations (step 370 of FIG. 3), respectively. Channel data may refer to any data related to channels, program data may refer to any data related to programs, and schedule data may refer to any data related to scheduling of programs. Examples of channel data, program data, and schedule data will be described further below. Each one of FIGS. 4-7 will now be described in detail.

Figure 4:
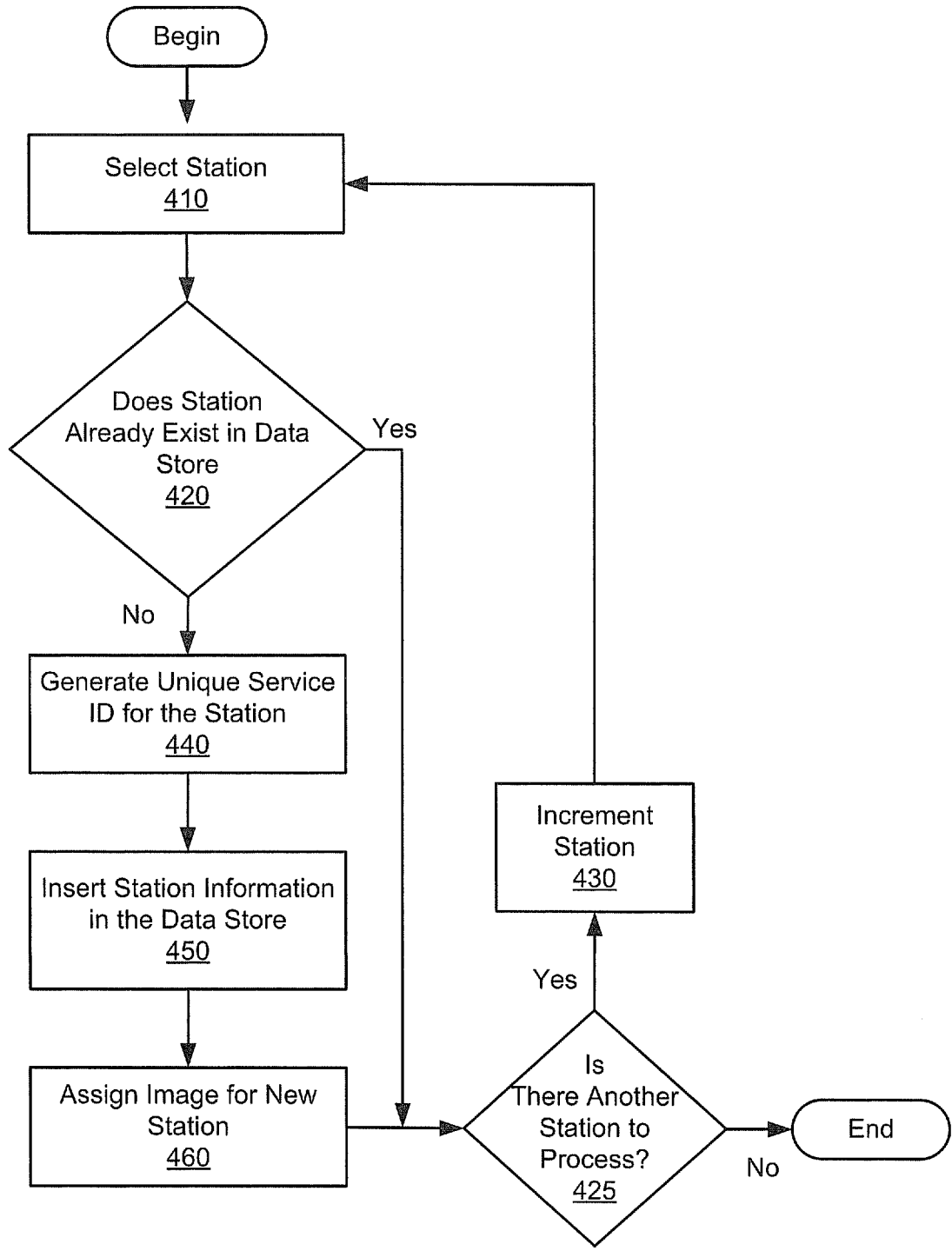
FIG. 4 illustrates an exemplary method of processing raw channel data.

FIG. 4 illustrates an exemplary method of processing raw channel data included in the raw program guide data 254. While FIG. 4 illustrates exemplary steps according to one implementation, other implementations may omit, add to, reorder, and/or modify any of the steps shown in FIG. 4.

In step 410, a particular station is selected. The data loader 260 may be configured to select and process station data included in the raw program guide data 254. A "station" may refer to any entity providing content (e.g., NBC), and station data may include any information associated with one or more such entities. Stations may be selected for processing in any suitable order. In certain implementations, the stations associated with channels in a channel lineup are processed sequentially beginning with a station associated a first channel in the lineup. A channel may be indicative of a particular instance of a station providing content as represented in a channel lineup. A channel may represent a particular frequency, range of frequencies, or other content carrier for broadcasting content.

In step 420, it is determined whether data representative of the selected station already exists in data store 220. If the station is already represented in the data store 220, processing moves from step 420 to step 425. In step 425, it is determined whether there is another station (in the raw program guide data 254) to be processed. The determination may be performed in any suitable manner. If there is no other station to be processed, the method of FIG. 4 ends. If there is another station to be processed, processing moves from step 425 to step 430. In step 430, the station is incremented. Processing then moves from step 430 to step 410, at which step the next station is selected for processing.

On the other hand, if it is determined in step 420 that the selected station does not already exist in the data store 220, processing moves from step 420 to step 440. In step 440, a unique service identifier ("service ID") is generated for the station. In certain implementations, each station in system 100 is assigned a unique service ID. The system 100 may be configured not to reassign a particular service ID to any other station. Also, the system 100 may be configured not to reassign a station with another service ID. The unique service ID for each station may facilitate and/or enhance certain functionalities, including, but not limited to, recording, parental control, and "favorites" functionalities. For example, if a station is moved from one position to another in a channel lineup (e.g., NBC is moved from channel 5 to channel 50), the service ID for that station is not changed. Accordingly, user settings such as scheduled recordings, parental controls, and favorites based on service IDs would not be affected by the lineup change.

In step 450, data associated with the station, including the service ID, is inserted into data store 220 as part of the program guide data 240.

In step 460, an image (e.g., a bitmap) is assigned to the new station. Any information included in the raw program guide data 254 may be used for identifying an image to be assigned to the station. In certain implementations, for example, an image may be selected based on a station name and call sign included in the raw program guide data 254. The data loader 260 may be configured to query the data store 220 for an image associated with the station name and call sign. Such images may be included in the resource data 250. If a matching image is not available in data store 220, a predefined default image may be assigned to the station. When a default image is used, the data loader 260 may create a log and/or reminder to indicate that a new image for the station should be requested and loaded into data store 220.

Processing moves form step 460 to step 425, which may be performed as described above to either end the method of FIG. 4 or to return processing to step 410 for the next station.

Figure 5A:
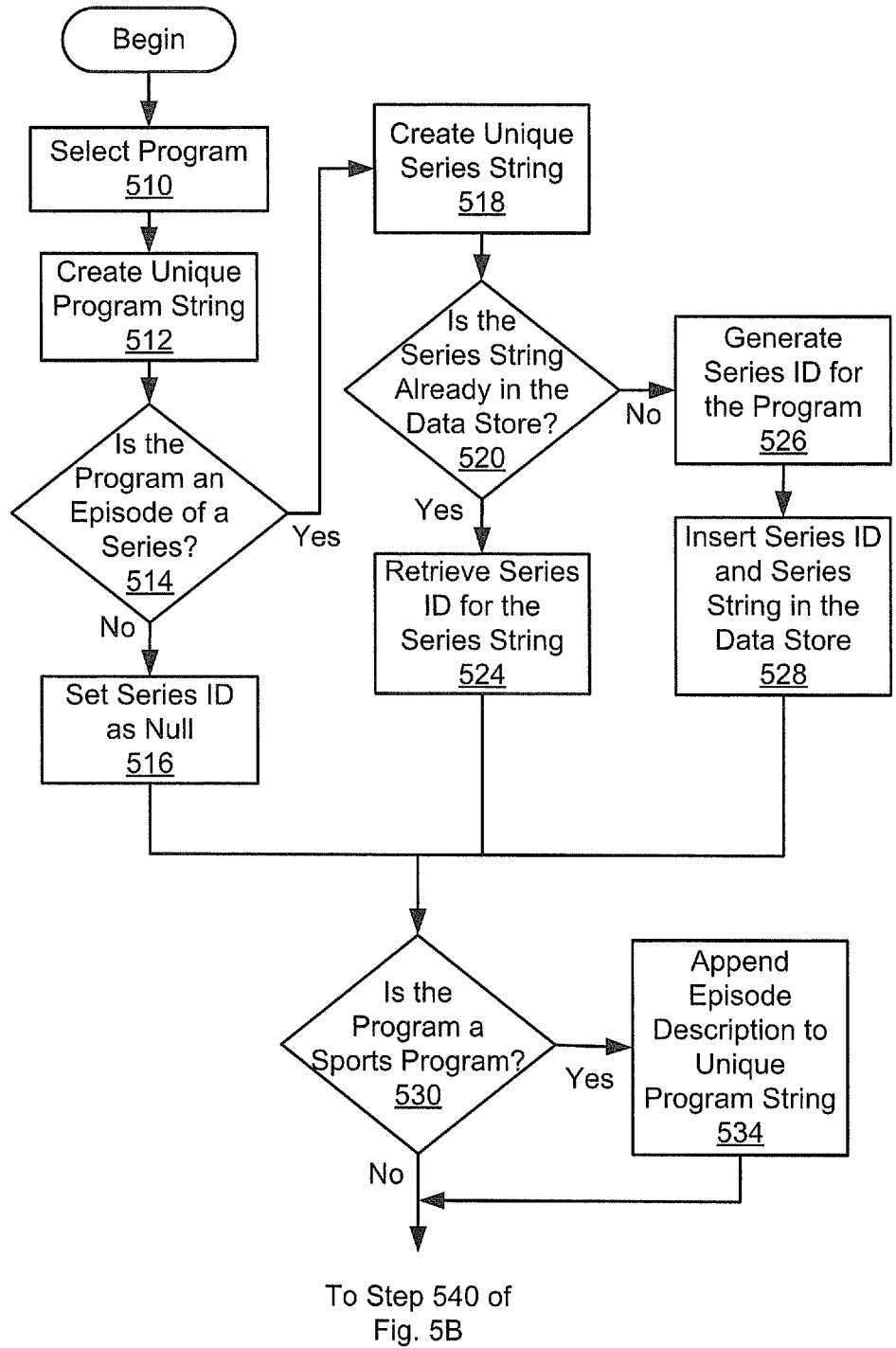
FIGS. 5A-B illustrate an exemplary method of processing raw program data.
Figure 5B:
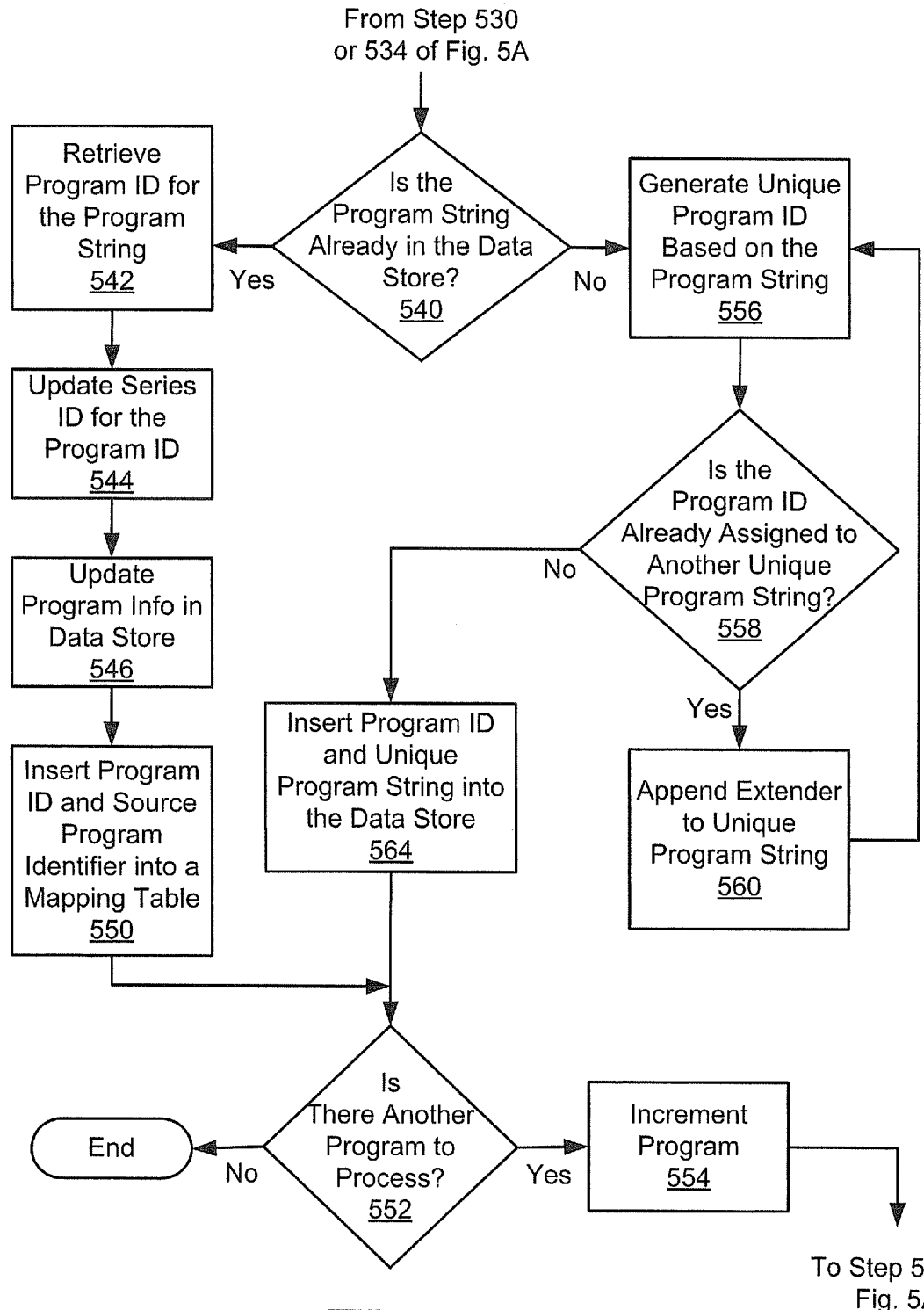

FIGS. 5A-B illustrate an exemplary method of processing raw program data. While FIGS. 5-AB illustrate exemplary steps according to one implementation, other implementations may omit, add to, reorder, and/or modify any of the steps shown in FIGS. 5A-B. The data loader 260 may be configured to perform any of the steps in FIGS. 5A-B. By processing raw program data, the data loader 260 is able to build a library of programs in the program guide data 240 of data store 220.

In step 510 of FIG. 5A, a particular program represented in the received raw program guide data 254 is selected. Programs may be selected and processed in any suitable order. In certain implementations, for example, programs associated with a particular station or channel may be processed in order (e.g., in order of scheduled broadcast) before moving on to programs associated with another station or channel.

In step 512, a unique program string is created for the selected program. In certain implementations, data loader 260 is configured to assign each program in the program guide data 240 a unique program string. A unique string may be determined in a manner that is capable of producing a unique string for each program in the program guide data 240. For example, the data loader 260 may be configured to generate a unique program string for a program based on data associated with the program (e.g., properties of the program), including a set of predetermined data fields associated with the program. In certain implementations, for instance, a unique program string is generated based on the title of the program (e.g., the full title of the program), the language (e.g., English) of the program, the year of release for the program, the episode title of the program if any, the episode number if any, and optionally the episode description is certain predefined cases (e.g., when the program is a sports program). This combination of data may optimize the probabilities that generated program strings are truly unique, even when the content delivery subsystem 111 processes large amounts of program data. In particular, the exemplary set of data fields listed above includes data descriptive of real, basic properties of a program, the combination of which will almost certainly vary between programs. In addition, the exemplary set of data fields is sufficiently basic for processing raw program guide data from different sources. In other words, the exemplary set of data fields is sufficiently basic to support provider independence so that unique program strings can be generated without being limited to data provided by a particular provider.

The data in the predefined set of fields may be combined in any suitable manner to form a unique program string for the program. For example, the data fields may include text strings that are concatenated to form a unique program string.

Certain pre-selected characters may be removed from the concatenated string. The removal of pre-selected characters can help minimize the possibility of any occurrences of multiple different program strings being generated for the same program. For example, many variations in textual string data can be accounted for and removed by removing pre-selected characters that commonly introduce the variations in the strings. For instance, data for a program may be included more than once in the raw program guide data 254, such as when a program is scheduled for broadcast multiple times and/or on multiple different channels. One problem with conventional program guide data processing applications includes a failure to account for variations between the different instances of the program data within raw program guide data 254. By removing pre-selected characters, the data loader 260 can account for and remove many variations between instances of program data. Consequently, the data loader 260 can generally reduce data redundancies, including redundancies that may have otherwise been introduced by variations in punctuation, spacing, etc. between different instances of program data. Minimization of data redundancies can generally help conserve memory and processing resources.

In certain implementations, text strings from the data fields in the predefined set of data fields are concatenated and at least one pre-selected character is removed from the string. Examples of pre-selected characters that can be removed may include, but are not limited to, spaces, commas, apostrophes, periods, exclamation points, question marks, quotation marks, hyphens, dashes, parentheses, brackets, slashes, colons, semi-colons, ampersands, ellipses, punctuation marks, and any combination or sub-combination thereof.

From step 512, processing moves to step 514. In step 514, it is determined whether the program is an episode of a series (e.g., a television series such as "FRIENDS"). This determination may be made in any suitable manner, including identifying the value of an "episode" or "series" flag associated with the program, for example.

If it is determined that the program is not an episode of a series, processing moves to step 516. In step 516, a series identifier ("series ID") is set as "null," which is representative of the program not being an episode of a series. Programs that are not episodes of a series may be referred to as "shows."

On the other hand, if it is determined in step 514 that the program is an episode of a series, processing moves from step 514 to step 518. In step 518, a unique series string is created. The series string may be created in similar fashion to the creation of the unique program string described above. Of course, the creation of the series string may be based on a different set of data, such as a set of program properties that would be common across different programs of a series.

In certain implementations, for example, the unique series string is created based on the full title of the program, the language of the program, and the year of release. The series string may be a concatenation of this data. As with the program string, one or more pre-selected characters, including any mentioned above, may be removed from the concatenation to form the unique series string.

In step 520, it is determined whether the generated series string is already stored in data store 220. If it is, processing moves to step 524. In step 524, a series identifier ("series ID") associated with the generated series string is retrieved from the data store 220.

On the other hand, if it is determined in step 520 that the generated series string is not already in data store 220, processing moves to step 526. In step 526, a series identifier ("series ID") is generated for the program 526. The series ID may be generated based on the series string. Step 520 may be performed in any suitable manner, including any manner that will produce unique series IDs for different series strings. For example, the series string may be input into a predefined heuristic (e.g., a hash table) that is configured to generate a series ID based on the series string. In certain embodiments, the series ID is a thirty-two bit number.

The series ID can be used to identify a series and any programs included in a series. Accordingly, maintaining a series ID in association with each series enables efficient identification of episodes of a series. One potentially useful application of the series ID is in content recording applications, which can utilize the series ID to identify and record one or more episodes of a series, including recording all episodes or any new episodes of the series.

Processing moves from step 526 to step 528. In step 528, the series ID and the associated series string are inserted in the data store 220.

Depending on the processing path followed in steps 514 through 528, processing may move from step 516, 524, or 528 to step 530. In step 530, it is determined whether the program is a sports program. This determination may be made in any suitable manner, including checking a flag (e.g., a genre flag) associated with the program.

If it is determined in step 530 that the program is not a sports program, processing moves directly from step 530 to step 540 of FIG. 5B. On the other hand, if it is determined in step 530 that the program is a sports program, processing moves to step 534. In step 534, an episode description associated with the program is appended to the unique program string. This helps ensure that unique program strings, and consequently unique program identifiers, will be generated for sports programs that may otherwise have similar properties that could lead to generation of duplicate program strings. The episode description generally includes information that can be used to differentiate sports programs for purposes of generating unique program strings. Examples of such information may include, but is not limited to, a description of participants (e.g., teams, players, drivers, etc.) in a sporting event. Steps similar to steps 530 and 534 could be introduced into the method of FIGS. 5A-B to help differentiate any other type of programs that may tend to have similar properties between programs. Processing moves from step 534 to step 540 of FIG. 5B.

In step 540, it is determined whether the unique program string is already stored in data store 220. If it is, processing moves to step 542. In step 542, a program identifier ("program ID") associated with the generated program string is retrieved from the data store 220.

Processing moves from step 540 to step 544. In step 544, the series ID for the program ID in the data store 220 is updated. Step 544 can help ensure that the series ID for a program is up to date by accounting for changes in different versions of raw program guide data 254. For example, a particular version of raw program guide data 254 may include an inadvertent mistake such as failure to identify a program as being part of a series. The third-party provider 255 may correct this mistake in a subsequent version of the raw program guide data 254. In such a situation, the data loader 260 can determine a series ID from the information in the revised version of the raw program guide data 254 and change the series ID value for a program from null to the determined series ID.

Processing moves from step 544 to step 546. In step 546, data associated with the program stored in the data store 220 is updated with the raw program guide data 254 associated with the program selected in step 510. This helps ensure that the information in data store 220 is kept up to date. Any or all of the data fields associated with the program may be updated, including program title, description, cast, genre, ratings, and advisories, for example. For example, updating the cast data helps ensure that first billed actors or actresses are listed first.

Processing moves from step 546 to step 550. In step 550, the program ID retrieved from the data store 220 and the source program identifier included in the raw program guide data 254 are inserted into a mapping table in data store 220. The mapping table may represent relationships between program guide data 240 and the raw program guide data 254 and may be used for reporting purposes. For example, if issues are found in the program guide data 240, the mapping table may be used to determine the related raw program guide data 254, and the identified data can be reported to the third-party data provider 255.

Figure 6A:
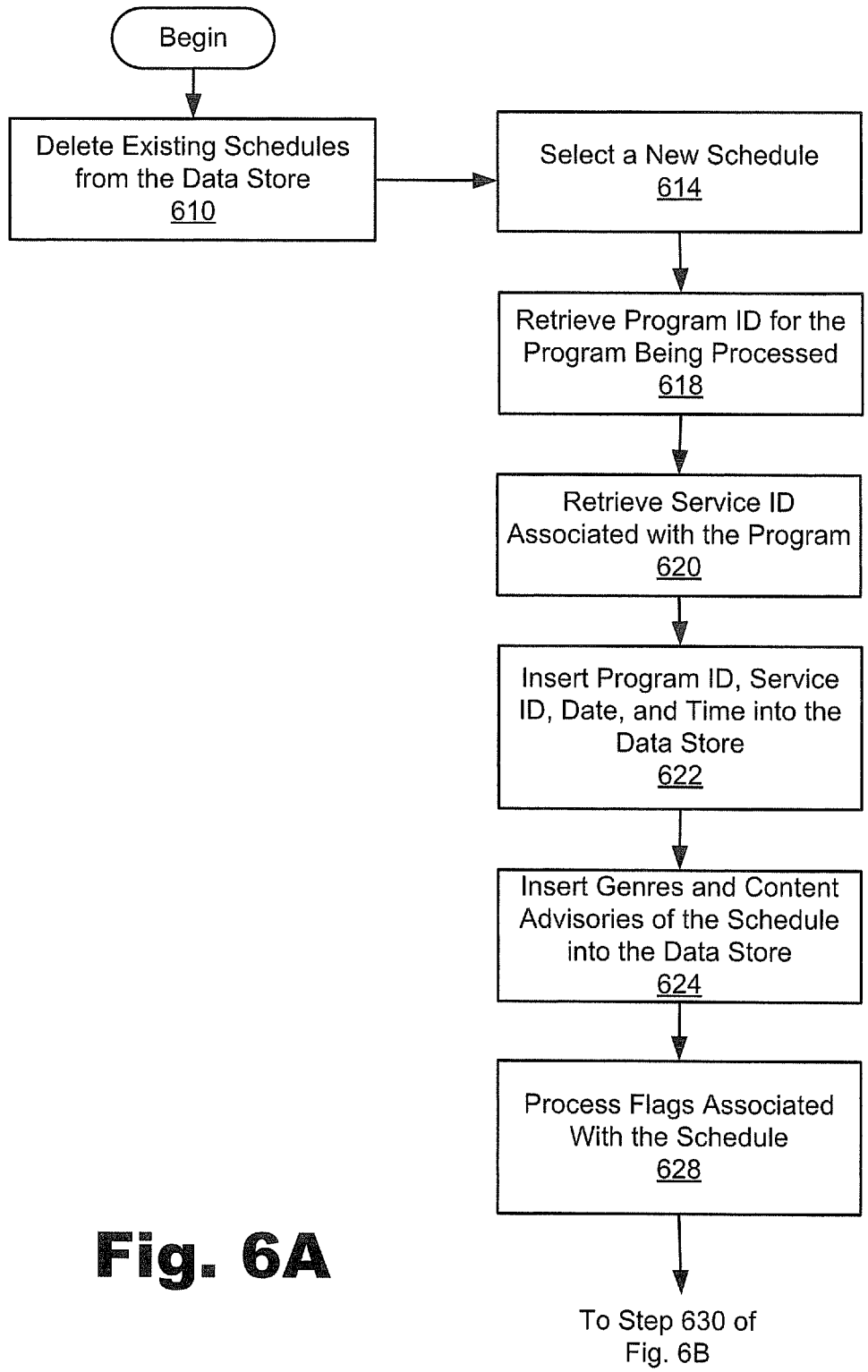
FIGS. 6A-B illustrate an exemplary method of processing raw schedule data.
Figure 6B:
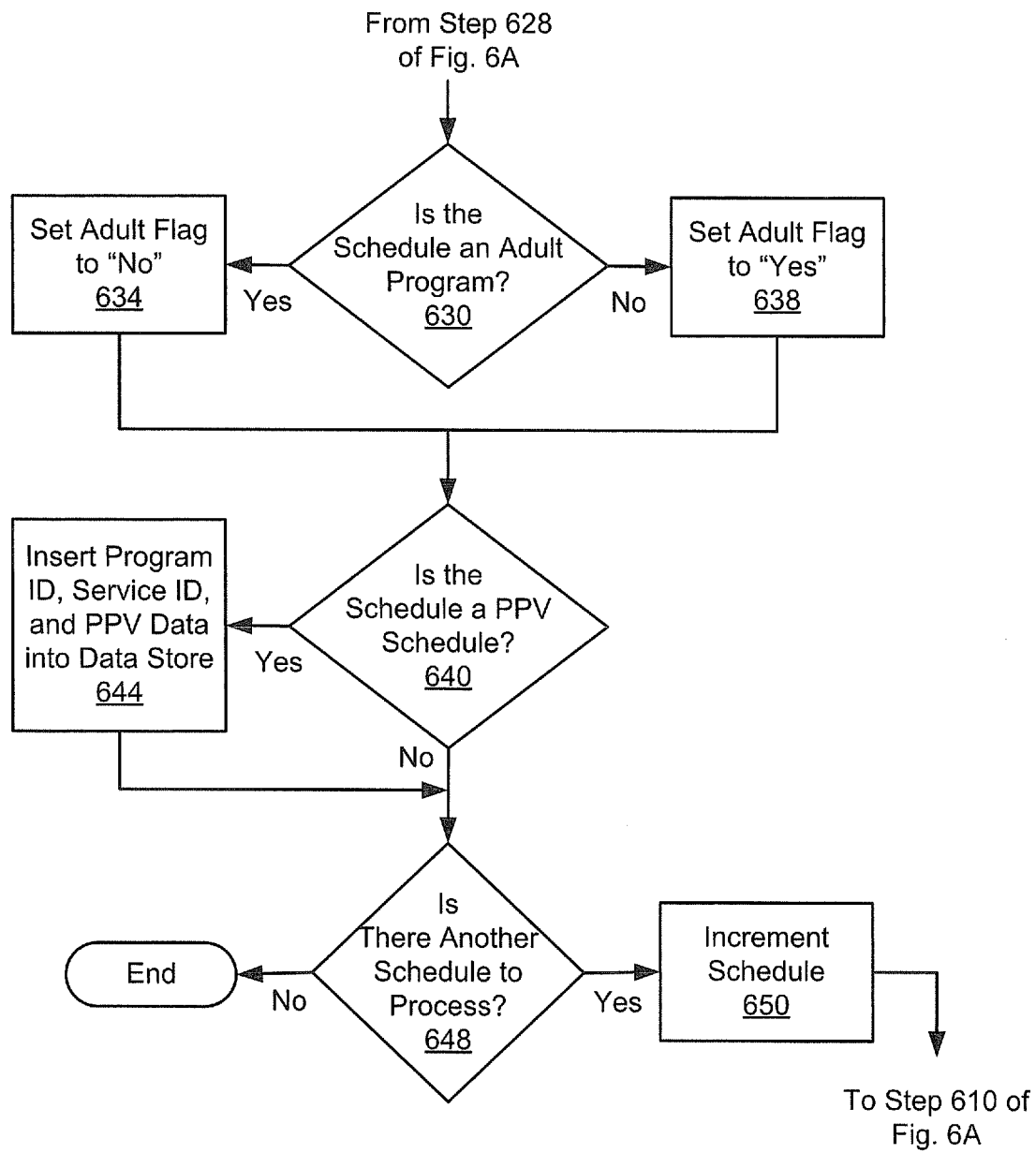

The mapping table may also be used for processing of schedule data as described in relation to FIGS. 6A-B. For example, schedule data in the raw program guide data 254 may include third-party provider identifiers. The mapping table may be used to map the third-party provider identifiers to the identifiers generated by the data loader 260 (e.g., program IDs and service IDs). The schedule data can then be associated with the appropriate programs and stations in the program guide data 240.

Processing moves from step 550 to step 552. In step 552, it is determined whether there is another program (in the raw program guide data 254) to process. The determination may be performed in any suitable manner. If there is no other program to be processed, the method of FIGS. 5A-B ends. If there is another program to be processed, processing moves from step 552 to step 554. In step 554, the program is incremented. Processing then moves from step 554 to step 510 of FIG. 5A, at which step the next program in the raw program guide data 254 is selected for processing.

On the other hand, if it is determined in step 540 that the unique program string generated in FIG. 5A is not in data store 220, processing moves to step 556. In step 556, a unique program identifier ("program ID") is generated based on the unique program string. The program ID may be generated from the unique program string in any suitable manner, including any manner that helps prevent or minimize the chances of duplicate program IDs being generated for different program strings.

The program ID may be generated by inputting the program string into a predefined heuristic (e.g., hash table) that is configured to generate a program ID based on a program string. In certain embodiments, step 556 generates a thirty-two bit number for the program ID.

Processing moves from step 556 to step 558. In step 558, it is determined whether the generated program ID is already assigned to another unique program string in the data store 220. The determination can be made in any suitable manner and can help prevent the same program ID from being assigned to different program strings.

If it is determined in step 558 that the generated program ID is already assigned to another program string, processing moves from step 558 to step 560. In step 560, an extension is appended to the unique program string. Any suitable extension may be appended. Each time step 560 is performed a counter may be incremented and the value of the counter used as the extension to ensure that the extension is unique for each iteration of step 560.

From step 560, processing loops back to step 556 for generation of another program ID based on the extended unique program string. Step 558 is then performed again to verify that the program ID has not been assigned to another program string. Accordingly, steps 556, 558, and 560 may form a loop that continues to be performed until a previously unused program ID is generated. Once it is determined in step 558 that the generated program ID is not already assigned to another program string, processing moves from step 558 to step 564

In step 564, the program ID and program string are inserted into the data store 220. Processing moves from step 564 to step 552, which is performed as described above to lead to a termination of the method of FIGS. 5A-B when there is not another program to process or to another iteration of the method of FIGS. 5A-B when there is another program in the raw program guide data 254 to be processed.

Generation of a unique program identifier for each program and a unique series identifier for each series represented in the program guide data 240 can provide various benefits, including reducing duplicate data. As described below, unique data identifiers may also be used for generating particular configurations of program guide data 240 that are configured to conserve memory and processing resources. As compared to conventional program guide data applications, the method of FIGS. 5A-B can generally provide increased accuracy and efficiency with respect to generating and maintaining truly unique identifiers for program guide data.

FIGS. 6A-B illustrate an exemplary method of processing raw schedule data. Schedule data included in the raw program guide data 254 may include any information related to broadcasting schedules and/or ordering information related to content such as television programs. While FIGS. 6A-B illustrate exemplary steps according to one implementation, other implementations may omit, add to, reorder, and/or modify any of the steps shown in FIGS. 6A-B. The data loader 260 may be configured to perform any of the steps in FIGS. 6A-B.

In step 610, existing schedules are deleted (i.e., cleared) from the data store 220. Step 610 may be performed in any suitable manner.

In step 614, a particular schedule in the received raw program guide data 254 is selected. Schedules may be selected and processed in any suitable order. In certain implementations, for example, schedules associated with a particular program, station, or channel may be processed in order (e.g., program-by-program) before moving on to other schedules associated with another program, station, or channel.

In step 618, the unique program ID for the program being processed is retrieved. The unique program ID, which may have been generated in the method of FIGS. 5A-B, may be retrieved from the data store 220.

In step 620, the unique service ID for the station associated with the program is retrieved. The service ID, which may have been generated in the method of FIG. 4, may be retrieved from the data store 220.

In step 622, the program ID, service ID, and start and end dates and times associated with the selected schedule are inserted into the data store 220. Step 622 may be performed in any suitable manner.

In step 624, genre description and content advisories (e.g., ratings) associated with the selected schedule are inserted into the data store 220. Step 624 may be performed in any suitable manner.

In step 628, one or more flags associated with the selected schedule are processed. Step 628 may include insertion of flag data into the data store 220. Schedule data flags may include any information descriptive of channel, program, or schedule data. Exemplary flags will be described below.

Processing moves from step 628 to step 630 of FIG. 6B. In step 630, it is determined whether the selected schedule includes an adult program. The determination may be made in any suitable manner, including checking a Motion Pictures Association of America ("MPAA") or other rating of a program or schedule included in the raw program guide data 254.

If the selected schedule is an adult program, an adult flag is set to "Yes" and inserted into the data store 220 in step 634. On the other hand, if the selected schedule is not an adult program, the adult flag is set to "No" and inserted in the data store 220 in step 638.

Processing moves from either step 634 or 638 to step 640. In step 640, it is determined whether the selected schedule is a pay-per-view ("PPV") schedule (e.g., the schedule includes a PPV program). The determination may be made in any suitable manner, including checking a PPV field included in the raw program guide data 254.

If the selected schedule is not a PPV schedule, processing moves from step 640 to step 648. On the other hand, if the selected schedule is a PPV schedule, processing moves to step 644 first before continuing on to step 648. In step 644, the unique program ID, service ID, and PPV data (e.g., PPV price) are inserted into the data store 220.

In step 648, it is determined whether there is another schedule in the raw program guide data 254 to be processed. If there is not another schedule, processing ends. If there is another schedule, processing moves to step 650. In step 650, the schedule is incremented. Processing then moves to step 610 of 6A so that the next schedule in the raw program guide data 254 can be processed in accordance with the method of FIGS. 6A-B.

Figure 7:
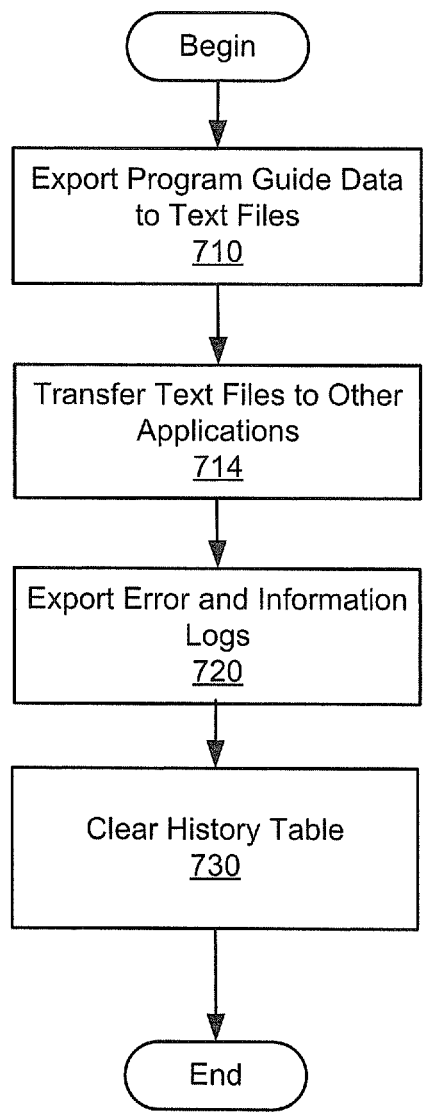
FIG. 7 illustrates an exemplary data load post-processing method.

Returning now to FIG. 3, once channel data, program data, and schedule data have been processed in steps 340, 350, and 360 and as described above in relation to FIGS. 4, 5A-B, and 6A-B, respectively, post processing operations may be performed in step 370. FIG. 7 illustrates an exemplary post processing method. While FIG. 7 illustrates exemplary steps according to one implementation, other implementations may omit, add to, reorder, and/or modify any of the steps shown in FIG. 7. The data loader 260 may be configured to perform any of the steps in FIG. 7.

In step 710, program guide data 240 may be exported to text files. In step 714, the text files may be transferred to other applications. Steps 710 and 714 may be performed to provide the program guide data 240 to other applications, teams, or organizations in a useable format.

In step 720, error and other information logs may be exported. Step 720 may be used for quality assurance and data monitoring purposes.

In step 730, a history table is cleared. Clearing of the history table may be configured to function as signal that the program guide data 240 is ready to be processed by the data slicer 270. Accordingly, the data slicer 270 may be configured to recognize when the history table has been cleared and to process the program guide data 240 as described below. As the data slicer 270 processes the program guide data 240, the history table may be populated.

In certain implementations, the history data table may include data for different geographic regions, and the data slicer 270 may populate the table to indicate when data for the regions has been processed. Accordingly, by clearing the history table, the data loader 260 may notify the data slicer 270 that program guide data 240 for one or more of the geographic regions is ready to be processed. Of course, any suitable indication may be used to signal that the method of FIG. 3 has completed and that the program guide data 240 is ready for processing. The method of FIG. 7 then ends.

Returning again to FIG. 3, once post processing operations have been performed in step 370, processing moves to step 380. In step 380, the data loader 260 waits (e.g., sleeps) until a predetermined time before moving processing to step 310 for receipt of another batch of raw program guide data 254. In certain embodiments, for example, the predetermined time may be at a time (e.g., midnight or an early morning hour) when usage is relatively low such that resources will be available for receiving and processing the raw program guide data 254.

Program guide data 240 stored in the data store 220 may be provided to the content processing subsystem 110 for use by one or more applications running on the content processing subsystem 110. For example, program guide data 240 may be used to populate a program guide user interface that the content processing subsystem 110 may generate and provide for presentation to a user. Instead of simply downloading the program guide data 240 to the content processing subsystem 110, however, the content delivery subsystem 111 may be configured to process the program guide data 240 and generate and provide an optimized configuration of program guide data 240 that can conserve the memory and processing resources of the content processing subsystem 110. The program guide data configuration may be generated by the data slicer 270 and may organize the program guide data in a manner that can minimize memory requirements for storing the data and support efficient operations on the data (e.g., data retrievals).

As described further below, in certain implementations, an exemplary program guide data configuration may be optimized based on the types of data included in the program guide data 240 and/or on usage patterns indicative of how program guide data 240 is normally used by the content processing subsystem 110. The optimization generally helps improve processing efficiencies while also minimizing memory resources used to store program guide data 240. For example, an optimized configuration of program guide data 240 may support rapid and efficient retrieval of data to be included in a program guide user interface generated by the content processing subsystem 110.

The program guide data 240 stored in the data store 220 may be configured for use by the data slicer 270. Accordingly, in certain implementations, the above-described data loading operations may prepare program guide data 240 for processing by the data slicer 270. For example, one or more of the unique identifiers included in the program guide data

240 may be used by the data slicer 270 in generating a particular configuration of program guide data 240. Examples of how the unique identifiers may be used will be described further below.

The data slicer 270 may include computing hardware, software, firmware, or any combination or sub-combination thereof. In certain embodiments, for example, the data slicer 270 may include one or more devices (e.g., servers) and/or applications running on the devices. For instance, the data slicer 270 may comprise a service configured to run on one or more computing devices such as one or more servers or a farm of servers.

The data slicer 270 may be configured to initiate processing of program guide data 240 in response to any predetermined event. In certain implementations, the data slicer 270 may be configured to monitor data included in the data store 220 and initiate processing of program guide data 240 when the monitored data satisfies a predetermined event. For instance, the data slicer 270 may monitor a history table included in the data store 220. When data in the history table is cleared by the data loader 260, the data slicer 270 can recognize this event and initiate processing of the program guide data 240. As the data slicer 270 processes the program guide data 240, the history table may be populated to indicate completion of processing events.

The data slicer 270 may begin processing the program guide data 240 may loading the data to be processed. In certain implementations, all of the program guide data 240 to be processed is loaded at the front end of the processing. This can help reduce data traffic and the load placed on the data store 220 by reducing the number of calls to be made to the data store 240. In other implementations, program guide data 240 may be loaded in pieces throughout the processing performed by the data slicer 270.

An exemplary configuration of program guide data 240 that may be generated by the data slicer 270 will now be described in detail. As used herein, the term "group" may be used to refer to any discrete grouping of data. A data group may be an electronic file (or simply "file") or other discrete data instance. A data group may include one or more discrete data structures. One or more of the data structures may be organized into an array of data structures in a data group.

In association with organizing program guide data 240 into various data groups and/or data structures in a configuration of program guide data 240, the data slicer 270 may be configured to organize program guide data 240 based on categories of the data. Accordingly, different categories of program guide data 240 may be stored in separate data structures and/or groups. Examples of categories that may be used include, but are not limited to, channel, lookup, schedule, series, episode, show, PPV, and cast/credit data. Examples of such categories of data and associated data structures that may be generated by the data slicer 270 are shown in Tables 1-15 below.

Program guide data 240 categorized as "channel data" may be included in two separate data structures (e.g., data tables) as depicted in Table 1 and Table 2.

TABLE 1

Channel Data

| Name | Type | Size | Description |
| --- | --- | --- | --- |
| Channel # | short | 2 | Channel Number on the Guide |
| Offset to Channel Strings | char | 4 | Offset to Channel Strings such as Name, Affiliation |

TABLE 1-continued

Channel Data

| Name | Type | Size | Description |
| --- | --- | --- | --- |
| Channel Index | short | 2 | Index to the location of the channel logo in a file containing all the channel logo bitmaps |
| Channel tier | char | 1 | Tier to which the service belongs to |
| Channel Flag | char | 1 | Indicates Adult and high definition (HD) Stations |
| Service ID | Int | 4 | Unique ID for a Station independent of its location on the Channel Lineup or the Region |
| BitMapID | Int | 4 | Id of the Bitmap to be used for Channel Logo |

TABLE 2

Channel Strings

| Name | Type | Size | Description |
| --- | --- | --- | --- |
| Channel Name size | Char | 1 | Size of the Channel Name which follows |
| Channel Name | string | | Name of the Channel |
| Channel Affiliation size | Char | 1 | Size of Channel Affiliation which follows |
| Channel Affiliation | String | | Affiliate of the Channel If Any |

The channel data structures may include data associated with channels represented in the program guide data 240, including, but not limited to, channel identifiers (e.g., channel numbers), channel tiers indicative of the tiers to which services belong, channel flags (e.g., adult and high definition channel flags), service IDs of stations associated with the channels, channel logo identifiers (e.g., bitmap IDs), channel identifier strings (e.g., channel name strings), and channel affiliation strings indicative of affiliates of channels if any. Channel strings data may be organized into a separate data structure (see Table 2). As described below, this can facilitate efficient indexing of a channel string without having to parse other strings data.

The channel data structures may also include indices for indexing data in other data structures. For example, the data structure shown in Table 1 includes a channel index to a location of a channel logo (e.g., a channel logo bitmap), which may be included in another data structure containing a plurality of channel logos for various channels. The data structure in Table 1 may also include at least one offset to a location in the channel strings data structure of Table 2, such as a location associated with a channel name string and/or channel affiliation string. The channel data structures may also include other information such as data indicative of the size of strings included in Table 2.

Program guide data 240 categorized as "lookup data" may be included in another data structure such as the data structure shown in Table 3.

TABLE 3

Lookup Data

| Name | Type | Size | Description |
| --- | --- | --- | --- |
| Number of Languages = A | short | 2 | Number of Language Strings which follow |

TABLE 3-continued

Lookup Data

| Name | Type | Size | Description |
| --- | --- | --- | --- |
| Languages | String | 45 | Array of Language Strings of Size A with each string of size 45 bytes |
| Number of Advisories = B | short | 2 | Number of Advisories which follow |
| Advisories | String | 30 | Array of Advisories of Size B with each string of size 45 bytes |
| Number of Genres = C | Short | 2 | Number of Genres which follow |
| Genres | String | 45 | Array of Genres of Size C with each string of size 45 bytes |
| Number of Categories = D | Short | 2 | Number of Categories which follow |
| Categories | String | 30 | Array of Categories of Size D with each string of size 45 bytes |
| Number of Categories = E | Short | 2 | Number of Category Colors which follow |
| Category Colors | Char | 1 | Array of Categories of Size E with each string of size 45 bytes |
| Number of Ratings = F | Short | 2 | Number of Ratings which follow |
| Ratings | String | 10 | Array of Ratings of Size F with each string of size 45 bytes |

The lookup data structure may include data (e.g., one or more master data tables) that can be referred to by other data structures for additional information related to content. Examples of such additional information that may be maintained in the lookup data structure may include, but are not limited to, program languages, advisories, genres, types, ratings, and any data that may be common between different programs. Program languages may include data representative of languages in which programming is available. Program advisories may include data representative of advisories concerning the contents of programs. For example, content advisories may include strings such as "Graphic Violence," "Adult Content," and any other potentially helpful description of the contents of programs. Program genres may include data representative of genres associates with programs. For example, program genres may include textual strings such as "drama," "comedy," "sitcom," "action," and "adventure." Program types may include data representative of types that may be associated with programs, including, but not limited to, types such as "kids," "series," "movie," "news," etc. Program ratings may include data representative of ratings (e.g., MPAA or other third-party ratings) that may be associated with programs.

By maintaining lookup data in a separate, master table data structure, the system 100 can minimize duplication of information in data that will be provided to the content processing subsystem 110. For example, multiple programs may have the same content advisory value. Instead of the same content advisory value being redundantly stored at a different location for each of the programs, the content advisory value can be stored just once in a master data list that can be referred to by other program guide data structures. Accordingly, the look up data structure may include any information related to and that tends to be shared or duplicative between programs.

Program guide data 240 categorized as "schedule data" may be included in another data structure such as the data structure shown in Table 4.

TABLE 4

Schedule Data

| Name | Type | Size | Description |
| --- | --- | --- | --- |
| Channel# | short | 2 | Channel Number |
| StartTime | Short | 2 | Number of Minutes since a Common Start Time |
| TV Rating [4b] | char | 1 | TV Rating: Index into the Ratings Lookup Table |
| Show Type [4b] | | | Show Type: Index into the Show Type Lookup Table |
| Format Flags | Char | 1 | HDTV 0x80 Stereo 0x40 CC 0x20 LIVE 0x10 LastScheduleofChannel 0x08 Repeat: 0x04 SAP: 0x02 DOLBY: 0x01 |
| TV Rating Suffix and Misc Flags | Char | 1 | S Rating: 0x80 D 0x40 L 0x20 V 0x10 FV 0x08 Premiere 0x04 Finale 0x02 Is Episode 0x01 |
| ProgramIndex | Short | 2 | Index into Show/Episode Table |
| PPV Index | Short | 2 | Index into PPV Table |
| Misc Flags | Char | 1 | Adult Title = 0x80 Remainder of 7 bits are used by Digital Video Recorder (DVR) |
| Total | | 12 | |

The schedule data structure may include data associated with scheduling information related to programs provided on one or more of the channels represented in the channel data structures. Scheduling information may include, but is not limited to, channel identifiers, program start times, program end times, program durations, program ratings, and various flags associated with programs (e.g., program format, HDTV, audio, closed captioning, "live" broadcast, adult content, program recording, and other flags).

The schedule data structure may also include indices for indexing data in other data structures. For example, the data structure shown in Table 4 includes indices to locations in the lookup data structure shown in Table 3 (e.g., an index into an array of ratings and an index into an array of show types included in Table 3), a program index to a location in either an episode or show data structure (described below), and a PPV index to a location in a PPV data structure (described below). The PPV index may also indicate whether a program is or is not a PPV program. For example, if the PPV index has a negative value, the corresponding program is not a PPV program. A non-negative value for the PPV index may indicate a location in the PPV data structure.

The schedule data in the data structure of Table 4 may include a flag indicative of whether a program is an episode of a series ("episode") or a single show ("show") that is not part of a series (such as a movie). The episode flag may be used for accessing detailed program information (e.g., program titles, descriptions, casts) stored in other data structures described below. For example, when the episode flag indicates that a program is an episode, the program index may be used to index data in an episode data structure such as that shown in Table 5. On the other hand, when the episode flag indicates that the program is a show, the program index may be used to index data in a show data structure such as that shown in Table 7.

Program guide data 240 categorized as "episode data" may be included in other data structures such as the data structures shown in Tables 5 and 6.

TABLE 5

Episode Data

| Name | Type | Size | Description |
|---|---|---|---|
| FIOS ID/Program ID | Long | 4 | Unique Identifier for the Program |
| Episode String OffSet | Long | 4 | Offset into the Episode String Table |
| SeriesIndex | short | 2 | Index to series data; |
| Actor Offset | Long | 4 | Offset into Actors Table for Cast Information |
| First Air Date | Long | 4 | First Air Date of the Episode |
| Reverse Lookup Start Index | Short | 2 | Start Index into Reverse Lookup Table |
| Reverse Lookup End Index | Short | 2 | End Index into Reverse Lookup Table |
| Total | | 22 | |

TABLE 6

Episode Strings

| Name | Type | Size | Description |
|---|---|---|---|
| Size of Episode Name | Char | 1 | Number of Bytes of Episode Name which Follows |
| Episode Name | Char | [Max 100] | Array of characters containing the Compressed Episode Name |
| Size of Episode Synopsis | Char | 1 | Number of Bytes of Episode Synopsis which Follow |
| Episode Synopsis | Char | [Max 250] | Array of characters containing the Compressed Episode Synopsis. |

The episode data structures may include data associated with episode type programs that are part of a program series (e.g., a program may be episode number one of season number three of a television series such as FRIENDS). Examples of episode data in the episode data structures may include, but are not limited to, unique program IDs, dates of first broadcasts of episodes, episode identifiers (e.g., episode names), and episode synopses. Episode string data such as episode names and synopses may be organized into a separate data structure (see Table 6).

Episode data structures may also include indices for indexing data in other data structures. For example, the data structure depicted in Table 5 includes a series index to a location of series data stored in another data structure (such as Table 9 below) containing series related information. The data structure in Table 5 also includes an offset to a location in the episode strings data structure of Table 6, such as a location associated with an episode name string and/or episode synopsis string. The value of the offset may be added to a start address of the data structure of Table 6 to obtain the address for a location in the data structure. The data structure in Table 5 also includes an offset to a location in a credits data structure (such as the credits data structure of Table 12). The offset may be used to identify and access data such as cast names for a program episode.

The episode data structure of Table 5 also includes indices to data that may be useful for reverse lookups of program guide data 240. In the example shown in Table 5, the episode data structure includes a start index and an end index into a reverse lookup data structure. A "reverse lookup" or "reverse lookup search" refers to any process for locating other program data associated with an identified program (e.g., episode). A reverse lookup data structure may include information descriptive of or indices to information descriptive channels data and/or schedule data associated with other broadcasts of a specific program episode. The episode data structures may also include other information such as data indicative of the size of strings included in Table 6.

Program guide data 240 categorized as "show data" may be included in other data structures such as the data structures shown in Tables 7 and 8.

TABLE 7

Show Data

| Name | Type | Size | Description |
|---|---|---|---|
| FIOS ID/Program ID | Long | 4 | Unique Identifier for the Program |
| MadeforTV_Starrating | char | 1 | Made For TV - 0x80 Star Rating = 0x00-0x08 |
| MPAA Rating | char | 1 | Index into Rating Lookup Table |
| Movie Year | short | 2 | Release Year of Movie |
| Movie Running Time | Short | 2 | Running Time in Minutes |
| Show Strings Offset | Long | 4 | Offset into String Table for Show Strings |
| Language | Char | 1 | Index into Language Lookup Table |
| Actor Offset | Long | 4 | Offset into Actors Table for Cast Information |
| Advisory Index 1 | Char | 1 | Index into Advisory Look up Table |
| Genre Index 1 | Char | 1 | Index into Genre Look up Table |
| Reverse Lookup Start Index | Short | 2 | Start Index into Reverse Lookup Table |
| Reverse Lookup End Index | Short | 2 | End Index into Reverse Lookup Table |
| Total | | 25 | |

TABLE 8

Show Strings

| Name | Type | Size | Description |
|---|---|---|---|
| Size of Show Name for Guide | Char | 1 | Number of Bytes of Show Name which Follow |
| Show Name for Guide | Char | [Max 20] | Array of characters containing the Show Name used on the Guide. |
| Size of Full Show Name | Char | 1 | Number of Bytes of Show Name which Follow |
| Full Show Name | Char | [Max 100] | Array of characters containing the Compressed Full Show Name |
| Size of Show Synopsis | Char | 1 | Number of Bytes of Show Synopsis which Follow |
| Show Synopsis | Char | [Max 250] | Array of characters containing the Compressed Show Synopsis used on the Guide. |

The show data structures may include data associated with programs that are not part of a program series (e.g., a movie). Examples of show data in the show data structures may include, but are not limited to, unique program IDs, dates of show releases (e.g., movie release years), show durations (e.g., movie running times), show identifiers (e.g., shortened and full show names), and show synopses. Show string data such as show names and synopses may be organized into a separate data structure (see Table 8).

The show data structures may also include indices for indexing data in other data structures. For example, the data structure depicted in Table 7 includes an offset to a location in the show strings data structure of Table 8, such as a location associated with a show name string and/or episode synopsis string. The value of the offset may be added to a start address of the data structure of Table 8 to obtain the address for a particular location in the data structure. The data structure in Table 7 also includes an offset to a location in a credits data structure (such as the credits data structure of Table 12). The offset may be used to identify and access data such as cast names for a show.

The show data structure of Table 7 also includes indices to data that may be useful for reverse lookups of program guide data 240. In the example shown in Table 7, the show data structure includes a start index and an end index into a reverse lookup data structure. These indices may be used to index scheduled data and/or channel data in other data structures. An exemplary reverse data lookup structure and search will be described further below.

The show data structure of Table 7 may also include indices into a lookup data structure such at the lookup data structure shown in Table 3. For example, the show data structure of Table 7 includes an language index to a location in an array of language data included in the lookup data structure, an advisory index to a location in an array of content advisory data included in the lookup data structure, and a genre index to a location in an array of genre data included in the lookup data structure. Accordingly, the show data structure depicted in Table 7 can provide references to content advisory, genre, language, and other data associated with a show and which is stored in other data structures. The show data structures may also include other information such as data indicative of the size of data strings included in Table 8.

Program guide data 240 categorized as "series data" may be included in other data structures such as the data structures shown in Tables 9 and 10.

TABLE 9

Series Data

| Name | Type | Size | Description |
|---|---|---|---|
| Series ID | long | 4 | Unique Identifier for a Series |
| Language and Made For TV Flag | char | 1 | Made for TV = 0x80. 7 Bits form index into Language Lookup Table |
| Advisory Index 1 | char | 1 | Index into Advisory Look up Table |
| Genre Index 1 | Char | 1 | Index into Genre Look up Table |
| Series String Offset | Long | 4 | Offset into the Series String Table |
| Reverse Lookup Start Index | Short | 2 | Start Index into Reverse Lookup Table |
| Reverse Lookup End Index | Short | 2 | End Index into Reverse Lookup Table |
| Total | | 15 | |

TABLE 10

Series Strings

| Name | Type | Size | Description |
|---|---|---|---|
| Size of Series Name for Guide | Char | 1 | Number of Bytes of Series Name which Follow |
| Series Name for Guide | Char | [Max 20] | Array of characters containing the Series Name used on the Guide. |
| Size of Full Series Name | Char | 1 | Number of Bytes of Series Name which Follow |
| Full Series Name | Char | [Max 100] | Array of characters containing the Compressed Full Series Name |

The series data structures may include data associated with series of program episodes, including any data that is common between episodes of a series. Examples of series data include, but are not limited to, unique series IDs and other series identifiers such as shortened and/or full names of series. Series string data such as shortened and full series names may be organized into a separate data structure (see Table 10).

The series data structures may also include indices for indexing data in other data structures. For example, the data structure of Table 9 includes an offset to a location in the series strings data structure of Table 10, such as a location associated with a series name string. The value of the offset may be added to a start address of the data structure of Table 10 to obtain the address for a location in the data structure.

The series data structure of Table 9 also includes indices to data that may be useful for reverse lookups of program guide data 240. In the example shown in Table 9, the series data structure includes a start index and an end index into a reverse lookup data structure.

The series data structure of Table 9 may also include indices into a lookup data structure such as the lookup data structure shown in Table 3. For example, the series data structure of Table 9 includes a language index to a location in an array of language data included in the lookup data structure, an advisory index to a location in an array of content advisory data included in the lookup data structure, and a genre index to a location in an array of genre data included in the lookup data structure. Accordingly, Table 9 can provide references to content advisory, genre, language, and other data associated with a series and which is stored in other data structures. The series data structures may also include other information such as data indicative of the size of data strings included in Table 10.

Program guide data 240 categorized as "PPV data" may be included in another data structure such as the data structure shown in Table 11. PPV data included in a PPV data structure may include any information associated with PPV programs, including, but not limited to, pricing, ordering (e.g., a telephone number string to be called to place an order), and availability information.

TABLE 11

PPV Data

| Name | Type | Size | Description |
|---|---|---|---|
| PPV Price | Char | 6 | Price of the PPV Program |
| PPV Phone String | Char | 13 | Phone number to be called to order PPV |

TABLE 11-continued

PPV Data

| Name | Type | Size | Description |
|---|---|---|---|
| PPV Impulse Flag | char | 1 | Flag to indicate if PPV can be purchased immediately |
| Total | | 21 | |

Program guide data 240 categorized as "credits data" may be included in another data structure such as the data structure shown in Table 12. Credits data in a credits data structure may include any information associated with the cast and/or credit members of programs, including, but not limited to, data strings of cast names for programs. The credits data structure may also include other information such as data indicative of the size of strings included in Table 12.

TABLE 12

Credits Data

| Name | Type | Size | Description |
|---|---|---|---|
| Size of Cast String = Z | Short | 2 | |
| Compressed Cast String | Char | Z | Cast string when uncompressed results in actor names (e.g., Tom Hanks, Meg Ryan, Alec Baldwin) |

The above exemplary configuration of program guide data structures can help conserve memory and processing resources, including the resources of the content processing subsystem 110 to which the configuration may be provided. Accordingly, richer user interfaces can be provided, even within the constraints associated with certain set-top boxes. One way that memory resources are conserved is through strategic organization of program guide data 240 into separate data structures, which generally helps minimize redundant data storage and processing. For example, common or repetitive data associated with various programs is not redundantly stored for each of the programs. For example, many episodes of "FRIENDS" may have the same cast information, and maintaining this information in a data structure that is separate from episode data structures avoids having to redundantly store multiple instances of the same cast data. In addition, by organizing program guide data 240 into separate data structures, the system 100 is able to leverage data that may be common to multiple programs when performing data retrieval operations. This can help conserve processing resources.

Further, by using indices and/or offsets to reference (e.g., index) data between the various data structures, lookup and retrieval processes are efficient as compared to conventional program guide data applications. For example, by separating string data into separate data structures, specific strings can be efficiently indexed and retrieved using indices included in other data structures, without having to parse through textual data. For example, for a retrieval of an episode name from a configuration of program guide data 240 that has been provided to the content processing subsystem 110, the content processing subsystem 110 can locate the appropriate episode data structure (such as Table 5) for the relevant episode and use an offset value in the episode data structure to index the corresponding episode string data representative of the episode name in an episode strings data structure (such as Table 6). In this process, the content processing subsystem 110 is able to access the episode name without parsing textual data. This process is also efficient because the use of an offset to index a data string is a constant time operation.

As depicted in Tables 1-12, program guide data 240 may be organized into data structures based on categories of the program guide data 240. Examples of such categories may include, but are not limited to, channel data, schedule data, lookup data, episode data, show data, series data, PPV data, credits data, string data, or any combination or sub-combination thereof. In certain implementations, the channel data is included in at least one channel data structure (see, e.g., Tables 1 and 2), lookup data is included in at least one lookup data structure (see, e.g., Table 3), schedule data is included in at least one schedule data structure (see, e.g., Table 4), episode data is included in at least one episode data structure (see, e.g., Tables 5 and 6), show data is included in at least one show data structure (see, e.g., Tables 7 and 8), series data is included in at least one series data structure (see, e.g., Tables 9 and 10), PPV data is included in at least one PPV data structure (see, e.g., Table 11), and credits data is included in at least one credits data structure (see, e.g., Table 12).

Lookup, episode, show, series, PPV, and credits data, or any combination or sub-combination thereof, may be collectively referred to as detailed program information. Accordingly, the associated data structures can be collectively referred to as detailed program information data structures. Lookup data may include detailed program information that is common across multiple programs. An organization of channel data, schedule data, and detailed program information into separate data structures can produce efficiencies for storing and processing the data, including efficiently retrieving specific data from a program guide data configuration, examples of which are described below.

As depicted in Tables 1-12, in certain implementations, exemplary data structures may include compressed and uncompressed textual data. For example, certain data strings may be compressed in the data structures, while other data strings are uncompressed. As mentioned above, data strings that are requested relatively less frequently than other data strings may be compressed and stored in the data structures. As depicted in Tables 1-12, examples of compressed textual data may include episode names, episode synopses, full show names, show synopses, full series names, and cast strings. Such data may be typically requested less frequently than other data in the data structures. Accordingly, more frequently requested textual data (e.g., short program names used more relatively frequently in program guide user interfaces) can be uncompressed to reduce processing demands associated with requests for such data. The above-described division between compressed and uncompressed string data can be used to balance memory storage and processing demands for specific implementations and thereby conserve memory and processing resources.

Any of the data strings in the data structures of Tables 1-12 may be compressed and decompressed individually. This can help conserve memory and processing resources. For example, a particular compressed data string being requested can be decompressed without having to decompress or otherwise parse other data strings.

The data slicer 270 may be configured to compress data strings, and the content processing subsystem 110 may be configured to decompress the compressed data strings. Any suitable technologies for compressing and decompressing textual data may be utilized. In certain implementations, the data slicer 270 and the content processing subsystem 1110 may be configured to utilize a well-known compression technology know as Huffman compression. Huffman compression supports individual compression and decompression of data strings. As is well known, Huffman compression is capable of efficiently compressing relatively smaller data strings by identifying repeating language patterns and without using a large dictionary, while certain other known compression technologies produce efficient compressions only for large amounts of textual data.

In certain implementations, different Huffman compression heuristics may be used for different types of data strings. For example, a first Huffman compression heuristic may be used to compress normal data strings such as program description or synopsis data strings. Such strings typically include a greater number of words with the first letter in lower case. The first Huffman compression heuristic may be tuned for these types of data strings. A second Huffman compression heuristic may be used to compress other data strings such as titles and names, which typically include a greater number of words with the first letter in upper case. As compared to the first Huffman compression heuristic, the second Huffman compression heuristic may utilize a different dictionary of tokens designed to account for the more frequent occurrences of words having an upper case first letter.

The use of Huffman compression can reduce processing demands for compression and/or decompression operations. For example, individual compression and decompression of data strings avoids unnecessary compression and decompression of irrelevant textual data.

Examples of certain data operations and associated orders of complexity will be described further below.

The data slicer 270 may be configured to organize program guide data 240, including the data structures represented by Tables 1-12, into separate groups of data. For example, the data slicer 270 may create a channel data group, a lookup data group, and at least one schedule data group and organize the data structures into these groups in accordance with predefined heuristics. In certain implementations, for example, the data groups may be discrete electronic files (of simply "files") that include the data structures depicted in Tables 1-12.

Figure 8:
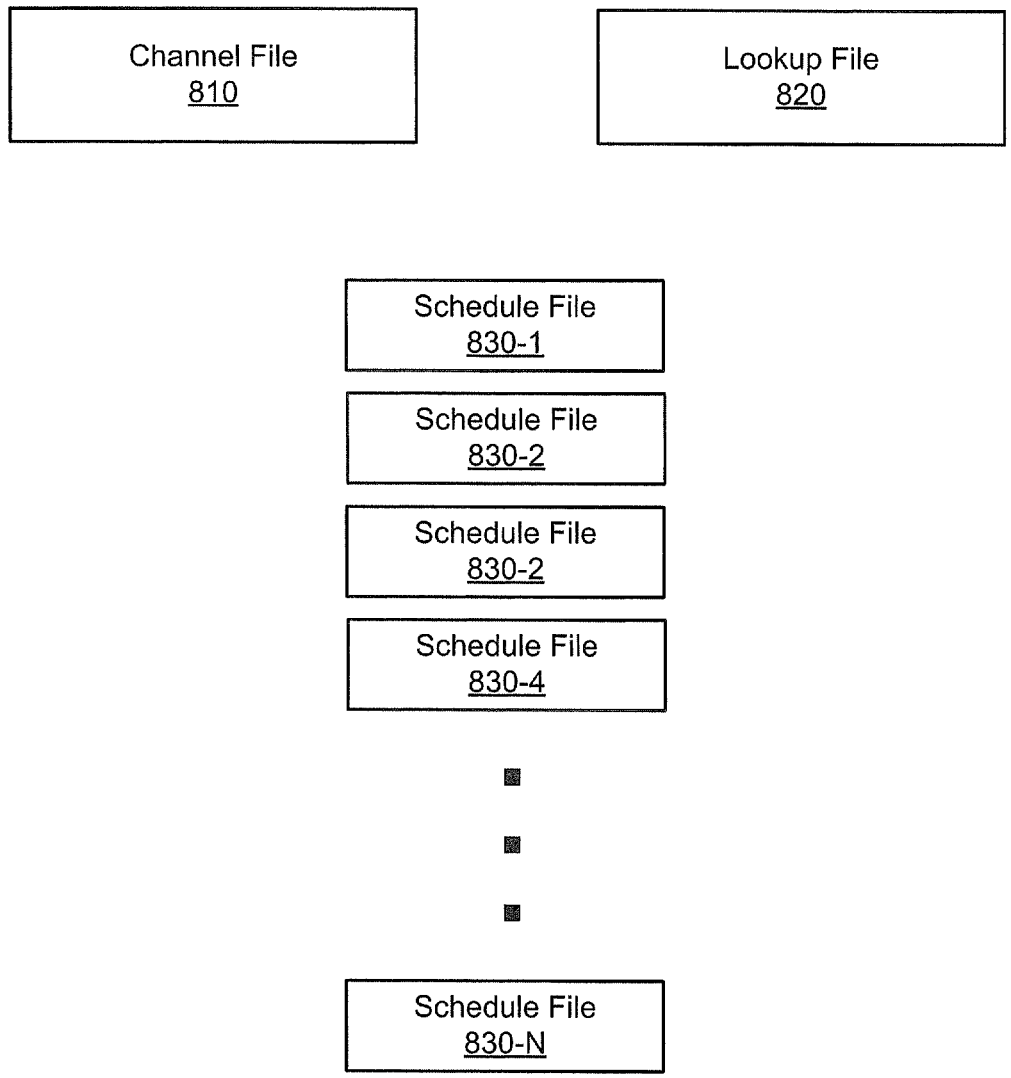
FIG. 8 illustrates an exemplary configuration of program guide data.

FIG. 8 illustrates an exemplary set of files that may be generated by the date slicer 270. As shown in FIG. 8, the files may include a channel file 810, a lookup file 820, and schedule files 830-1 through 830-N (collectively "schedule files 830"). In certain implementations, the files include program guide data 240 for fourteen days of programming, and fourteen schedule files 830 are generated, with each of the schedule files 830 including data for approximately one day (e.g., approximately twenty-four hours) of programming. The use of a discrete schedule file 830 for approximately one day of program guide data 240 can provide for certain efficiencies in storing and/or processing the program guide data 240.

For example, a user of the content processing subsystem 110 is typically interested in program guide data 240 for the current day. By storing programming data for approximately one day in a discrete schedule file 830, the system 100 can provide the requested data in an efficient manner. By way of an example, requests for programming data for the current can be received from multiple content processing subsystems 110 such as when content processing subsystems 110 request data at a common predetermined time or when content processing subsystems 110 power up after a power failure. In conventional applications, this can cause a large number of requests to be sent to the content delivery subsystem 111. When one schedule file 830 includes approximately one day of programming data, the content processing subsystems 110, which are likely to request programming data for the current day, are also likely to request the same schedule file 830. This enables the content delivery subsystem 111 to cache the schedule file 830 for the current day so that requests can be served more quickly than if the requested data has to be repeatedly retrieved piecemeal from data store 220.

Moreover, in certain implementations, configuring one schedule file 830 for approximately one day of data can provide an optimal file size for download from the content delivery subsystem 111 to the content processing subsystem 110. Division of program guide data 240 into smaller segments would generally require the content processing subsystem 110 to make an increased number of requests to the content delivery subsystem 111. This may waste resources, especially in implementations in which overhead for connecting to the content delivery subsystem 111 is considerable. Organizing program guide data 240 into larger segments (e.g., approximately two days of programming data included in a file) may cause an unnecessary load on network resources (e.g., bandwidth) for common program guide data 240 usage patterns, including when programming data for only the current day would satisfy a request. Programming data for days other than the current day is typically not in as high of demand as data for the current day and can be requested and downloaded in response to specific requests (e.g., on demand).

Exemplary files and file structures that may be included in an optimized configuration of program guide data 240 generated by the data slicer 270 will now be described. As shown, the exemplary data structures described above may be included in the exemplary files.

Table 13 illustrates an exemplary structure for the lookup file 820. As Table 13 illustrates, the lookup file 820 may include data indicative of a file type (e.g., a lookup file type), date the file was created, and a version of the file. The lookup file 820 may also include any of the data included in Table 3, including language, content advisory, genre, type, and rating data. This data may be organized in the lookup file 820 as shown in Table 13, including as arrays of language, content advisory, genre, type, and rating data.

TABLE 13

Lookup File Format

| Field | Size | Details |
| --- | --- | --- |
| PageType_ChannelBlock# | 1 | Slice File Type |
| SliceDate | 4 | Date of creates of the File |
| Version | 4 | Version of the File. Incremented everyday. |
| Number of Languages = A | 2 | Refer to Table 3 |
| Languages | A*45 | Refer to Table 3 |
| Number of Advisories B | 2 | Refer to Table 3 |
| Advisories | B*30 | Refer to Table 3 |
| Number of Genres = C | 2 | Refer to Table 3 |
| Genres | C*45 | Refer to Table 3 |
| Number of Categories = D | 2 | Refer to Table 3 |
| Categories | D*30 | Refer to Table 3 |
| Number of Categories = D | 2 | Refer to Table 3 |
| Category Color Ids | D*1 | 1 Byte number indicating the Category's Color |
| Number of Ratings = E | 2 | Refer to Table 3 |
| Ratings | E*10 | Refer to Table 3 |

Table 14 illustrates an exemplary structure for the channel file 810. As Table 14 illustrates, the channel file 810 may include data indicative of a file type (e.g., a lookup file type), date the file was created, and a version of the file. The channel file 810 may also include any of the data included in Tables 1 and 2, including channel data shown in Table 1 and channel data strings shown in Table 2. The data may be organized in the channel file 810 as shown in Table 14, including as arrays of the channel data structures depicted in Tables 1 and 2, for example. For example, the channel file 810 may include an array of channel data structures (Table 1) and an array of channel strings data structures (Table 2).

TABLE 14

Channel File Format

| Field | Size | Details |
| --- | --- | --- |
| PageType_ChannelBlock# | 1 | Slice File Type |
| SliceDate | 4 | Date of creates of the File |
| Version | 4 | Version of the File. Incremented everyday. |
| Number of Channels = A | 2 | |
| Channel Data | A*18 | Refer to Table 1 |
| Number of Channels = A | 2 | |
| Channel Strings Data | A*Channel Strings | Refer to Table 2 |

Table 15 illustrates an exemplary structure for a schedule file 830. As Table 15 illustrates, the schedule file 830 may include data indicative of a file type (e.g., a lookup file type), date the file was created, and a version of the file. The schedule file 830 may also include any of the data shown in Tables 4-12, including schedule, episode, show, series, PPV, and credits data. The schedule file 830 may include other data, including, but not limited to, data indicative of number of shows, number of series, number of episodes, number of PPV shows, schedule indices and counts, schedule start times, schedule durations, schedule duration counts, number of credits, reverse lookup counts and arrays for shows, series, and episodes, and sizes and total sizes of strings data. The data may be organized in the schedule file 830 as shown in Table 15, including as arrays of the schedule, episode, show, series, PPV, and credits data structures depicted in Tables 4-12. For example, the schedule file 830 may include an array of show data structures (Table 7), an array of show strings data structures (Table 8), an array of series data structures (Table 9), an array of series strings data structures (Table 10), an array of episode data structures (Table 5), an array of series strings data structures (Table 6), an array of schedule data structures (Table 4), an array of PPV data structures (Table 11), and an array of credits data structures (Table 12).

TABLE 15

Schedule File Format

| Field | Size | Details |
| --- | --- | --- |
| PageType_ChannelBlock# | 1 | Slice File Type |
| SliceDate | 4 | Date of creates of the File |
| Version | 4 | Version of the File. Incremented everyday. |
| Number of Shows = A | 2 | |
| Shows Data | A*25 | Refer to Table 7 |
| Total Size of Show Strings = B | 4 | |

TABLE 15-continued

Schedule File Format

| Field | Size | Details |
| --- | --- | --- |
| Number of Shows = A | 2 | |
| Show Strings Data | B | Refer to Table 8 |
| Number of Series = C | 2 | |
| Series Data | C*15 | Refer to Table 9 |
| Total Size of Series Strings = D | 4 | |
| Number of Series = C | 2 | |
| Series Strings Data | D | Refer to Table 10 |
| Number of Episodes = E | 2 | |
| Episodes Data | C*22 | Refer to Table 5 |
| Size of Episode Strings = F | 4 | |
| Number of Episodes = E | 2 | |
| Episodes Strings Data | F | Refer to Table 6 |
| Number of PPV Shows = G | 2 | |
| PPV Data | G*20 | Refer to Table 11 |
| Schedule Index Count = H | 2 | |
| Schedule Index Array | H*2 | |
| Common Schedule Start Time | 4 | |
| Number of Schedules = I | 2 | |
| Schedule Data | I*12 | Refer to Table 4 |
| Last Schedule Duration Count = J | 2 | |
| Schedule Duration Count | J*2 | |
| Total Size of Cast String | 4 | |
| Number of Cast Data = K | 2 | |
| Cast Data | | Refer to Table 12 |
| Shows Rev Lookup Count = L | 2 | |
| Shows Reverse Index Array | L*2 | |
| Series Rev Lookup Count = M | 2 | |
| Series Reverse Index Array | M*2 | |
| Episode Rev Lookup Count = N | 2 | |
| Episode Reverse Index Array | N*2 | |

The data slicer 270 may sort data included in the above files. This may be performed when generating the files or at some other suitable time. For example, an array of channel data structures (Table 1) may be sorted by channel identifiers, an array of schedule data structures (Table 4) may be sorted by channel indices and program start times, an array of episode data structures (Table 5) or an array of show data structures (Table 7) may be sorted by unique program identifiers, and an array of series data structures (Table 9) may be sorted by unique series identifiers. Such pre-sorted data configurations can support efficient operations on the data in the files, including efficient data retrieval operations. As described below, for example, efficient search heuristics, such as a binary search heuristic, may be used on pre-sorted arrays of data, which enables data to be retrieved efficiently with reduced processing overhead.

Before the program guide data configuration is made available on the network 125, the data slicer 270 may validate the configuration. The data slicer 270 may include a simulator designed to imitate operations typically performed by the content processing subsystem 110. Using the simulator, the data slicer 270 can process the data included in the configuration to ensure that the data is valid (e.g., not corrupt). Exemplary validation operations may include, but are not limited to, parsing the program guide data configuration, determining whether the number of schedule, show, episode, and series data structures are correct, verifying that the size of the program guide data configuration is within a predetermined limit (described below), performing logical checks such as making sure that the number of episodes is greater than the number of series represented in the program guide data, and verifying that file header and footer information is correct.

The data slicer 270 may be configured to control the size of a program guide data configuration. For example, before a program guide data configuration is made available on the network 125, the data slicer 270 may ensure that the size of the configuration is within a predetermined maximum size limit. This may be especially beneficial in implementations in which the content processing subsystem 110 has an upper limit on the program data file size that can be processed.

If a generated program guide data configuration is not within the predetermined maximum size limit, the data slicer 270 may discard the configuration and generate another, reduced size program guide data configuration. For example, the data slicer 270 may be configured to shorten certain program guide string data and generate another program guide data structure based on the shortened string data. The data slicer 270 may be configured to repeat this process such that each pass will produce a smaller size program guide data configuration. Once the size of the program guide data configuration is within the predetermined maximum size limit, it may be made available on the network 125.

Once the data slicer 270 has generated an optimized configuration of program guide data 240, such as the exemplary configuration described above and depicted in Tables 1-15, the content delivery subsystem 111 is ready and configured to provide at least a subset of the program guide data configuration to the content processing subsystem 110. For example, the content delivery subsystem 111 (e.g., the network interface unit 210) may provide a channel file 810, lookup file 820, and one or more of the one schedule files 830 to the content processing subsystem 110 via network 125.

The program guide data configuration may be provided to the content processing subsystem 110 using any suitable communication technologies and at any suitable time. For example, at least a subset of the program guide data configuration may be downloaded to the content processing subsystem 110 at off peak times (e.g., midnight). In certain implementations, at least a subset of an updated program guide data configuration is provided at a predetermined time each night. For example, a channel file 810, a lookup file 820, and at least one schedule file 830 may be downloaded to the content processing subsystem 110 at a predetermined time each day.

One or more of the schedule files 830 may be included in a transmission (e.g., download) of a program guide data configuration to the content processing subsystem 110. For example, fourteen separate schedule files 830 representative of approximately fourteen days of program guide data 240 may be downloaded. By way of another example, one schedule file 830 representative of approximately one days of program guide date 240 may be downloaded while other schedule files 830 are maintained by the content delivery subsystem 111 such that they may be readily accessed by the content processing subsystem 110. In other words, a channel file 810, a lookup file 820, and a schedule file 810 including program guide data 240 for approximately one day of programming may be downloaded at a predetermined time each day. Program guide data 240 for other days may be downloaded in response to specific requests from the content processing subsystem 110. Such a configuration may help conserve the resources of the content processing subsystem 110 network 125, and the content delivery subsystem 111 at least because normal usage patterns of program guide data generally include requests just for program guide data 240 for the current day. Accordingly, the program guide data 240 for a current day may be stored and made readily available locally by the content processing subsystem 110. When a user requests other data that is stored in another schedule file 830, the content processing subsystem 110 may provide a request the content delivery subsystem 111 to transmit the additional data (e.g., another schedule file 830 including the additional data).

An exemplary content processing subsystem 110 and processes for retrieving program guide data 240 configured in accordance with Tables 1-15 will now be described.

Figure 9:
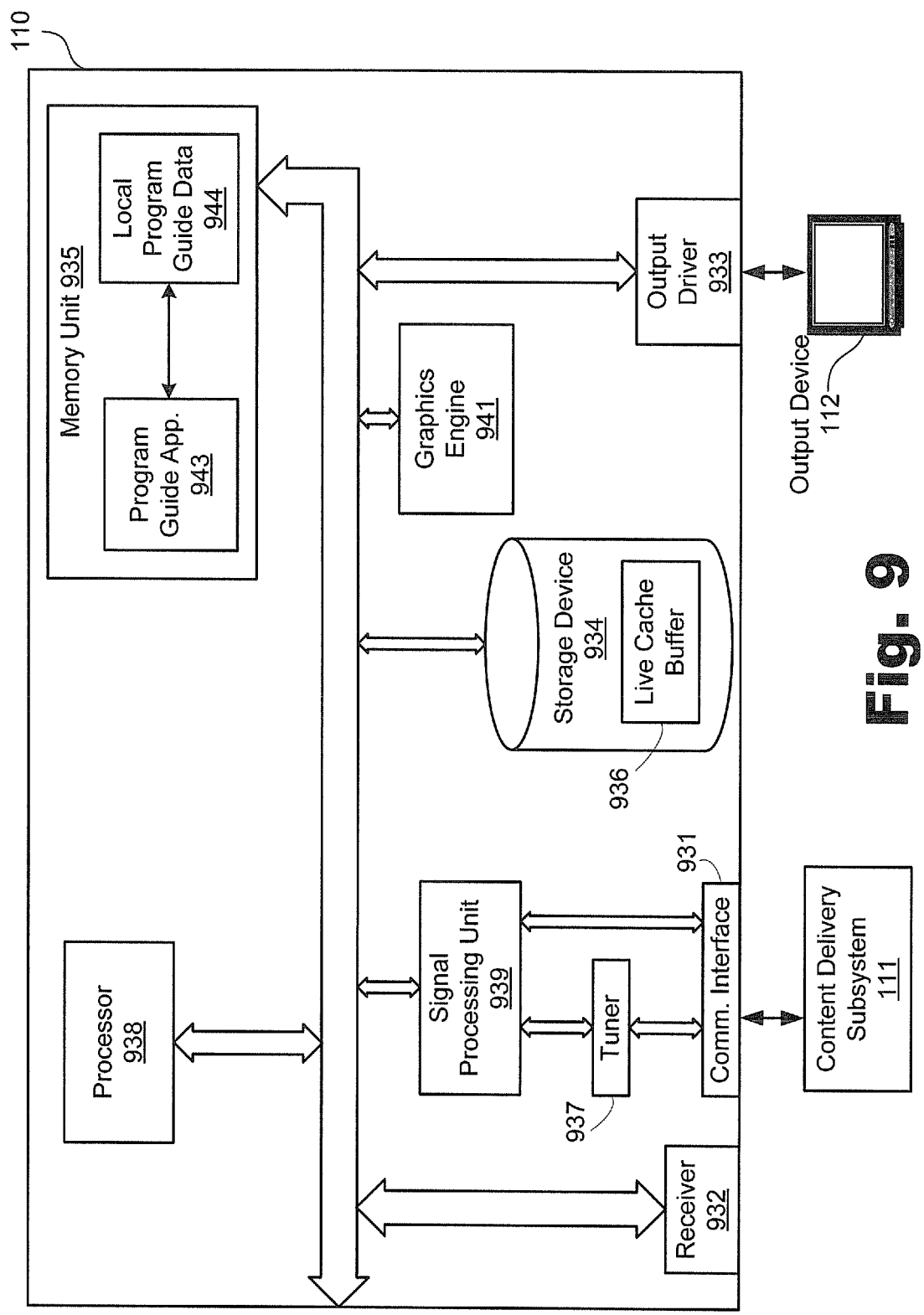
FIG. 9 illustrates an exemplary content processing subsystem.

FIG. 9 is a block diagram of an exemplary content processing subsystem 110 (or simply "processing subsystem 110"). The processing subsystem 110 may include any combination of hardware, software, and firmware configured to process an incoming data stream provided by the content delivery subsystem 111. For example, the processing subsystem 110 may receive a data stream from the content delivery subsystem 111 and process any content included in the data stream, including any media content 230, program guide data 240, and resource data 250 included in the data stream. The processing subsystem 110 may include, but is not limited to, a set-top box ("STB"), home communication terminal ("HCT"), digital home communication terminal ("DHCT"), stand-alone personal video recorder ("PVR"), digital video disc ("DVD") player, video-enabled phone, mobile telephone, and personal computer.

While an exemplary processing subsystem 110 is shown in FIG. 9, the exemplary components illustrated in FIG. 9 are not intended to be limiting. Indeed, additional or alternative components and/or implementations may be used. Various components of the processing subsystem 110 will now be described in additional detail.

As shown in FIG. 9, the processing subsystem 110 may include a communication interface 931 configured to support communications with the content delivery subsystem 111, including receiving content from the content delivery subsystem 111. The communication interface 931 may include any device, logic, and other technologies suitable for communications with the content delivery subsystem 111, including transmitting signals including requests for data (e.g., program guide data 240 and/or resource data 250) and receiving signals and/or data representative of content (e.g., media programs). The communication interface 931 can be configured to interface with any suitable communication media, protocols, and formats, including any of those mentioned above.

The processing subsystem 110 may also include a receiver 932 configured to receive input commands from a user input device (not shown). The user input device may include, for example, a remote control, keyboard, game controller, or any other suitable input device (e.g., mobile devices such as personal digital assistants ("PDAs") and mobile phones) that may be configured to communicate with the receiver 932 via a wireless link (e.g., an IR link), electrical connection, or any other suitable communication link.

The processing subsystem 110 may also include an output driver 933 configured to interface with or drive the output device 112, including video and audio devices. The output driver 933 may include any combination of hardware, software, and firmware as may serve a particular application.

Storage device 934 may include one or more data storage media, devices, or configurations and may employ any type, form, and combination of storage media. For example, the storage device 934 may include, but is not limited to, a hard drive, network drive, flash drive, magnetic disc, optical disc, or other non-volatile storage unit. Content (e.g., media content and program guide data) may be temporarily and/or permanently stored in the storage device 934.

The storage device 934 of FIG. 9 is shown to be a part of the processing subsystem 110 for illustrative purposes only. It will be understood that the storage device 934 may additionally or alternatively be located external to the processing subsystem 110.

The processing subsystem 110 may also include memory unit 935. Memory unit 935 may include, but is not limited to, FLASH memory, random access memory ("RAM"), dynamic RAM ("DRAM"), or a combination thereof. In some examples, as will be described in more detail below, various applications (e.g., a program guide application 943) and data (e.g., local program guide data 944) used by the processing subsystem 110 may reside in memory unit 935.

As shown in FIG. 9, the storage device 934 may include one or more live cache buffers 936. The live cache buffer 936 may additionally or alternatively reside in memory unit 935 or in a storage device external to the processing subsystem 110. The live cache buffer 936 can provide fast access to recently accessed data or content.

Tuner 937 may be configured to selectively receive content carried on a particular channel (e.g., television channel), stream, address, frequency or other carrier. For example, tuner 937 may be tuned to a particular media channel such that the content carried on the media channel is received and can be processed by the processing subsystem 110.

In some examples, the processing subsystem 110 may include multiple tuners 937 such that content carried on different media channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 937 is temporarily buffered, or stored, in the live cache buffer 936. If there are multiple tuners 937, there may be a live cache buffer 936 corresponding to each of the tuners 937.

While tuner 937 may be used to receive various types of content-carrying signals broadcast by content delivery subsystem 111, content processing subsystem 110 may be configured to receive other types of content signals (including media content signals) from the content delivery subsystem 111 and/or other source without using a tuner. For example, content delivery subsystem 111 may broadcast digital streams of data packets (e.g., Internet Protocol ("IP") based data packets) that can be received without using a tuner. For such types of content signals, including in-band and/or out-of-band signals, the communication interface 931 may receive and forward the signals directly to the signal processing unit 939 without going through the tuner 937. For an IP-based signal, for example, the signal processing unit 939 may function as an IP receiver or transceiver (e.g., a modem).

As shown in FIG. 9, the processing subsystem 110 may include one or more processors, such as processor 938 configured to control the operations of the processing subsystem 110. The processing subsystem 110 may also include a signal processing unit 939 configured to process incoming content. The signal processing unit 939 may be configured, for example, to demodulate and parse encoded digital media content. In some examples, the processing subsystem 110 may include one or more signal processing units 939 corresponding to each of the tuners 937.

As shown in FIG. 9, the processing subsystem 110 may also include a graphics engine 941 configured to generate graphics that are to be displayed by the output device 112. The graphics may include, but are not limited to, views of media content (e.g., "on-video" screen views), program guides user interfaces, and other graphics. One or more processors of the processing subsystem 110 (e.g., processor 938 and graphics engine 941) may generate and provide output signals configured to cause the output device 112 to present content included in the output signals. Output signals may be provided to the output device 112 by way of the output driver 933.

One or more applications residing within the processing subsystem 110 may be executed upon initiation by a user of the processing subsystem 110, by the content delivery subsystem 111, or by the occurrence of predefined events. The applications, or application clients, may reside in memory unit 935 or in any other area of the processing subsystem 110 and be executed by one or more processors (e.g., processor 938) of the content processing subsystem 110.

Figure 10:
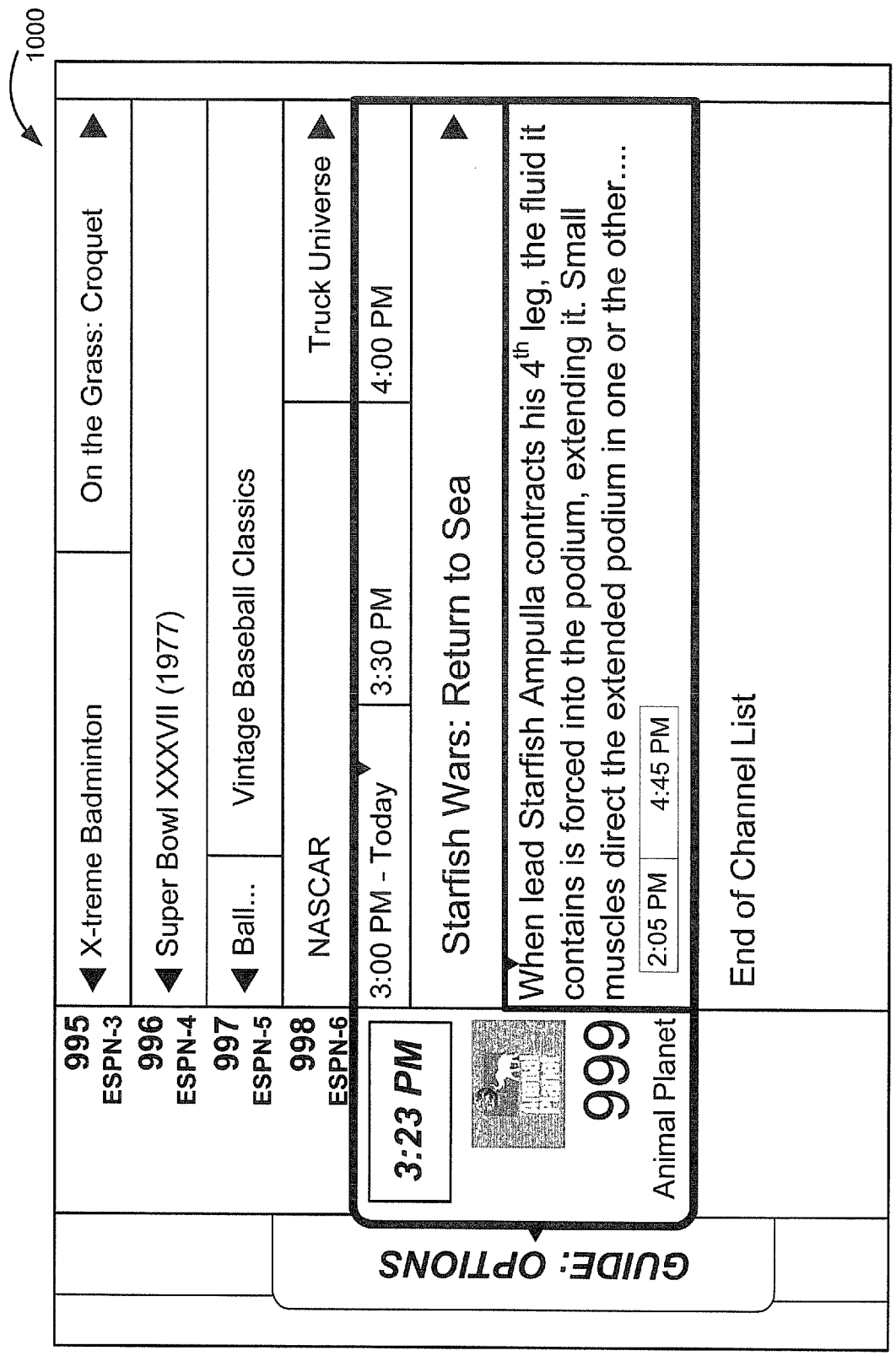
FIG. 10 illustrates an exemplary program guide user interface.

As shown in FIG. 9, one of the applications may be a program guide application 943, which may be configured to generate a program guide user interface that may be provided for presentation by the output device 112. The program guide user interface may include programming data, including any program guide data 240 that has been received from the content delivery subsystem 111. FIG. 10 illustrates an exemplary program guide user interface 1000 that may be generated by the program guide application 943 and displayed by the output device 112.

The program guide user interface 1000 may be generated from data stored within the processing subsystem 110 and/or data received from an external source such as the content delivery subsystem 111. For example, in generating the program guide user interface 1000, the program guide application 943 may be configured to request and utilize data provided by the content delivery subsystem 111, utilize locally stored data, or use a combination of local and remotely requested data, including program guide and/or resource data.

The program guide user interface 1000 may include program guide data 240, which may be retrieved from the content delivery subsystem 111 on demand and/or in advance of the program guide user interface 1000 being generated. In certain implementations, for example, program guide data 240 is periodically retrieved from the content delivery subsystem 111 and stored locally by the processing subsystem 110. For example, updated program guide data 240 may be downloaded on a daily basis. Of course, the processing subsystem 110 may be configured to periodically download program guide data 240 more or less frequently, as may suit a particular implementation. A retrieval of program guide data 240 from the content delivery subsystem 111 may fetch a predetermined amount of data, such as program guide data 240 for one, two, or more days of programming, depending, for example, on the particular configuration and memory capabilities of the processing subsystem 110. The predetermined amount of data to be retrieved may be configurable by a user of the processing subsystem 110 or an operator of the content delivery subsystem 111.

Whether retrieved on demand or in advance, program guide data 240 may be utilized to generate the program guide user interface 1000. In certain implementations, the processing subsystem 110 may store retrieved program guide data 240 locally and then utilize the locally stored program guide data to generate the program guide user interface 1000. The locally stored program guide data may be periodically updated with up-to-date program guide data 240 received from the content delivery subsystem 111, as described above. Additionally or alternatively, program guide data 240 may be retrieved on demand and utilized to generate the program guide user interface 1000.

Returning now to FIG. 9, program guide data 240 that has been received and stored by the content processing subsystem 110 may be referred to as local program guide data 944. The local program guide data 944 may be configured in accordance with the exemplary data configurations described above, including the exemplary configurations illustrated in Tables 1-15. The data configurations may provide or facilitate certain benefits, including conservation of memory and processing resources of the content processing subsystem 110.

The local program guide data 944 may be stored in memory unit 935, storage device 934, or any other suitable component of processing subsystem 110. Program guide application 943 may be configured to access and utilize the local program guide data 944. For example, the program guide application 943 may access and retrieve data included in the local program guide data 944 for use in generating the program guide user interface 1000.

Exemplary program guide data retrieval processes will now be described. The exemplary retrieval processes can utilize and leverage the exemplary data configurations of Tables 1-15. Program guide data is typically retrieved from the local program guide data 944 as described below, but can alternatively or additionally be retrieved from the program guide data 240 stored in data store 220.

Retrieval of program guide data 944 may be performed in response to the occurrence of any suitable predefined event(s). For example, program guide data 944 may be retrieved as part of generating a program guide user interface such as the program guide user interface 1000 in FIG. 10. In particular, program guide data 944 may be retrieved and used to populate the program guide user interface 1000.

Program guide data 944 can be retrieved based on one or more search parameters, including but not limited to, any of the data fields in the data structures of Tables 1-15. For example, program guide data 944 may be retrieved based on channel and time data, such as a channel identifier (e.g., channel number) and a program start time. By way of another example, program guide data 944 may be retrieved based on a unique program ID and/or series ID. This type of data retrieval may be used for "reverse lookups" of related broadcasts (e.g., future airings) of certain programs.

Figure 11:
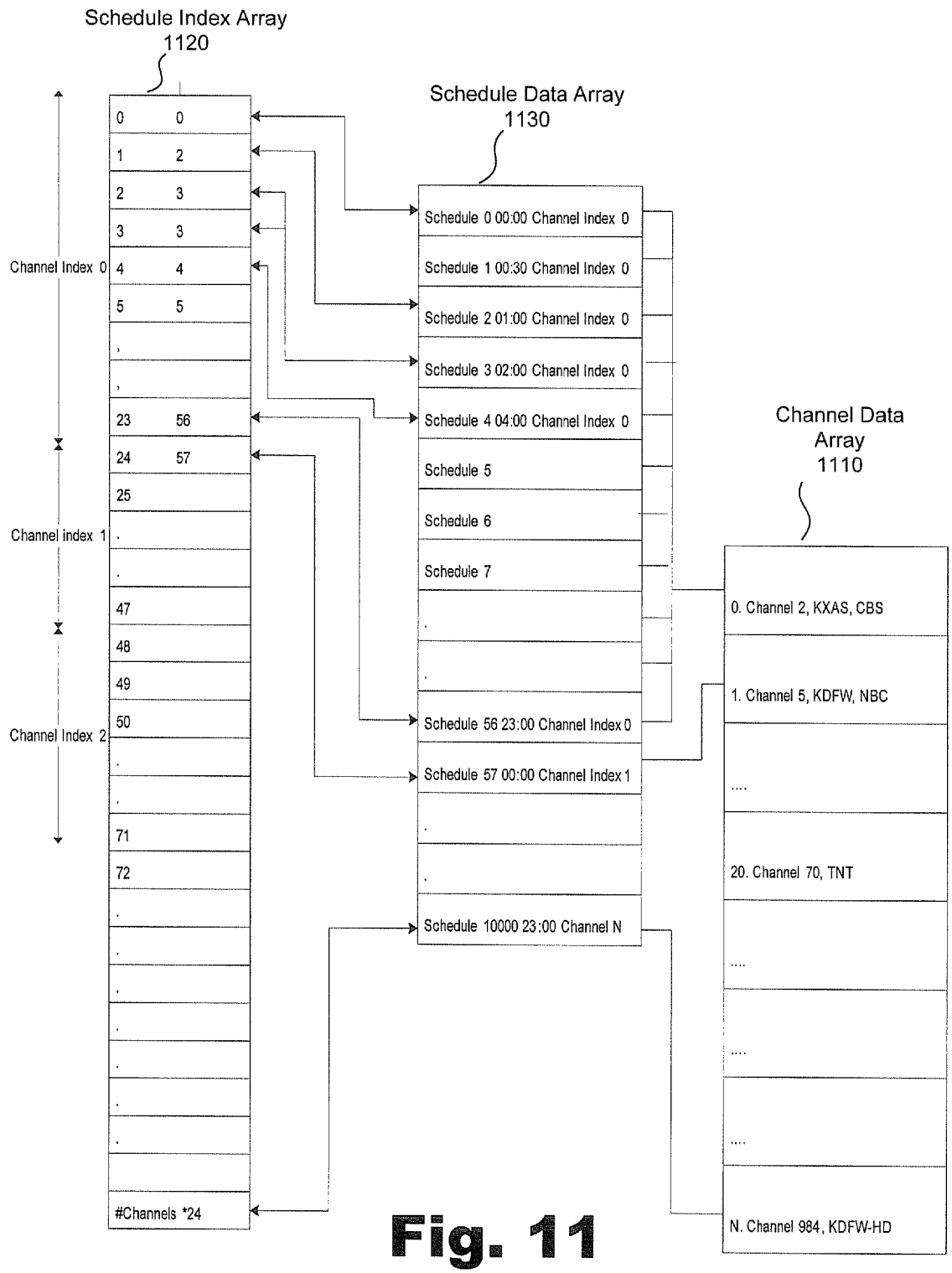
FIGS. 11-13 illustrate data retrieval operations in relation to program guide data included in an optimized program guide data configuration.
Figure 12:
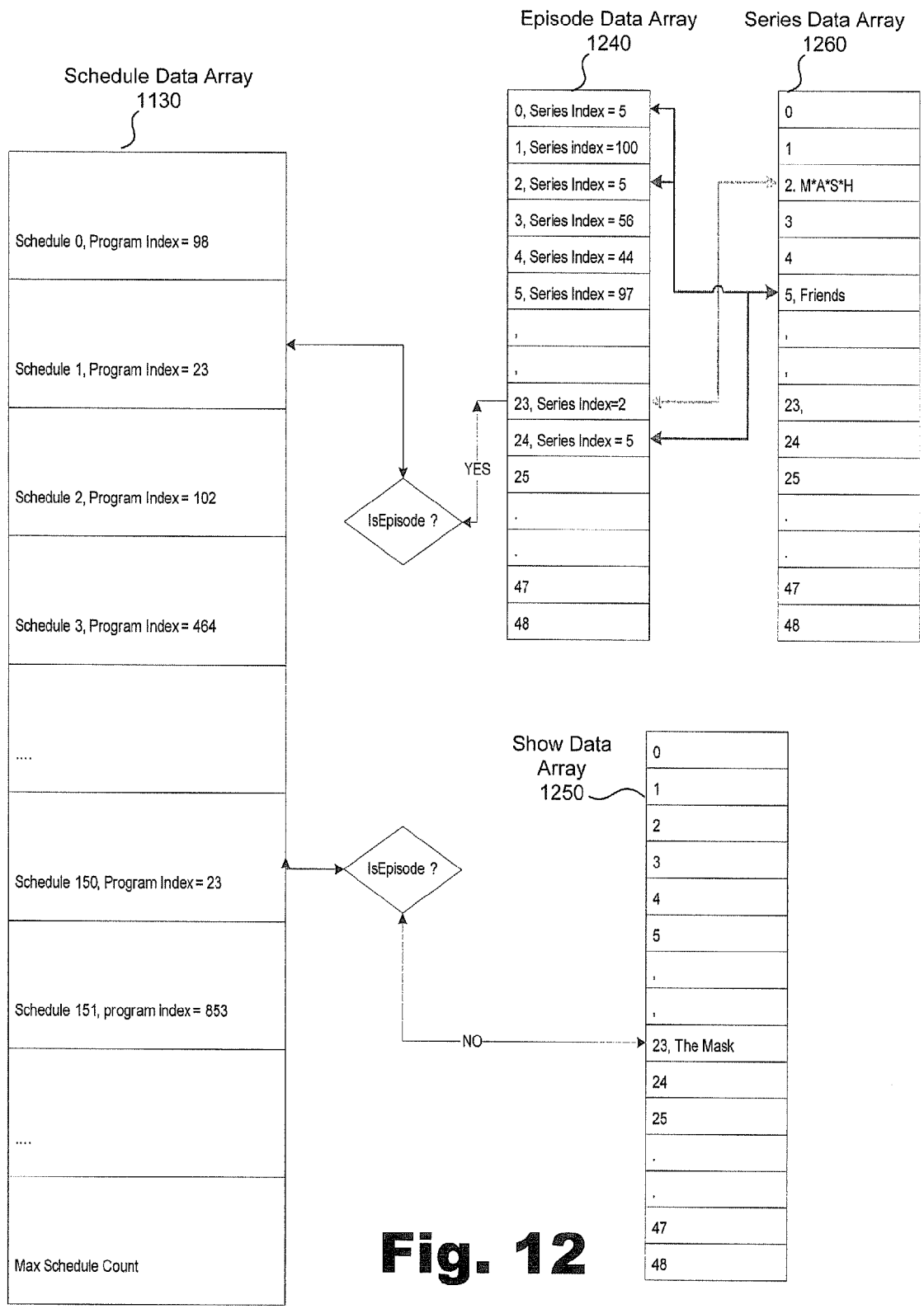
Figure 13:
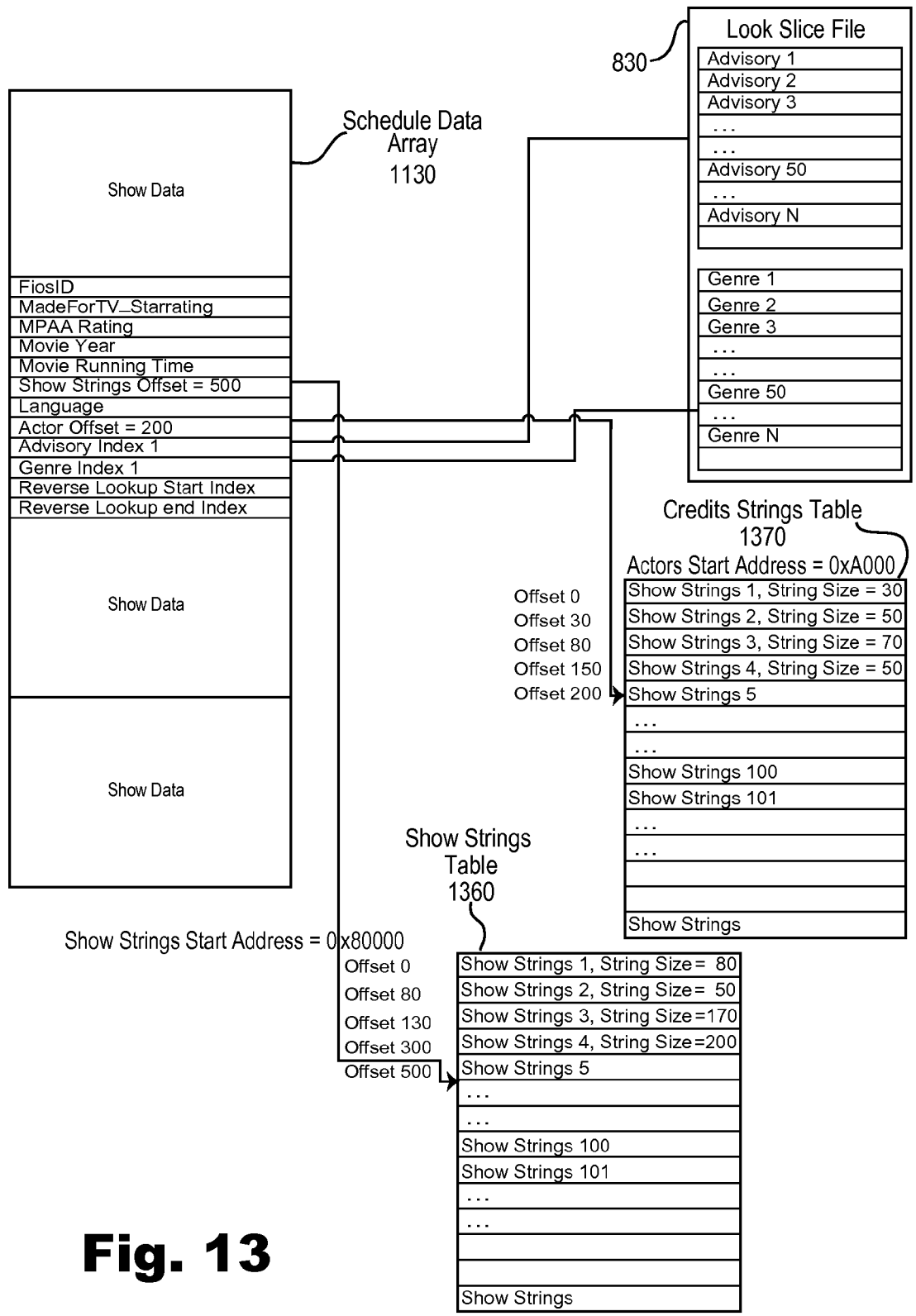

FIGS. 11-13 illustrate an exemplary retrieval of program guide data 944 from an exemplary program guide data configuration based on a channel identifier and start time. For the exemplary retrieval, it is assumed simply for illustrative purposes that one and a half hours of programming time beginning at a start time may be retrieved for each channel to be displayed in a program guide user interface 1000. However, the time period may be adjusted as may suit any particular implementation. In the specific example described, program guide data 944 will be retrieved for "channel 2" for a time period from 1:00 am to 2:30 am for a particular day.

The program guide application 943 may be configured to instruct one or more processors to perform the exemplary retrieval. The program guide application 943 may receive search parameters, including a channel identifier (e.g., channel 2) and a start time (e.g., 1:00 am of a particular day).

The program guide application 943 may be configured to use the search parameters to identify corresponding schedule data. For example, the program guide application 943 may initiate a search of an array of channel data structures. FIG. 11 illustrates a portion of an exemplary channel data array 1110, which may be included in channel file 810 and may include one or more channel data structures (e.g., see Table 1) associated with one or more channels.

A search of the channel data array 1110 may be used to locate the channel data structure corresponding with the channel specified in the retrieval parameters. When the search parameter value is an identifier for "channel 2," the corresponding channel data structure may be located in the channel data array 1110.

In certain implementations, the channel data array 1110 is pre-sorted (e.g., by channel identifier) and a binary search may be used to search for a channel data structure. As mentioned above, a binary search is more efficient that other types of searches (e.g., a linear search).

The identified channel data structure includes a channel index associated with the requested channel. As shown in the channel data array, the channel index for channel 2 is zero ("0").

The program guide application 943 may determine in which "partition" the relevant program guide data 944 is stored. "Partition" may refer to one or more of the schedule files 830 containing program guide data 944 as illustrated in FIG. 8 and Tables 1-15 (particularly Table 15). In certain implementations, each schedule file 830 corresponds with approximately one day of scheduled programming (i.e., approximately twenty-four hours of scheduled programming) and the appropriate partition is determined by the day in which the requested time slot occurs. In this particular example, the requested time slot of 1:00 am-2:30 am of the current day occurs in the first partition, meaning that the first schedule file 830-1 is the appropriate schedule file 830 to be accessed.

The program guide application 943 may utilize the channel index located in the channel data array 1110 and the start time parameter to identify one or more slots in a schedule index array included in the schedule file 830-1 (see Table 15). An exemplary schedule index array is represented by reference number 1120 in FIG. 11.

A predefined heuristic may be used to map the channel index and the start time parameter to one or more corresponding slots in the schedule index array 1120. In an exemplary implementation, the channel index ("ChannelIndex") and start time ("HourofDay") are used as input into the following heuristic to determine a slot value ("Slot") in the schedule index array 1120.

(ChannelIndex)*24+HourofDay=Slot

In the particular example being described, the channel index for channel 2 is zero ("0") and the start time is 1:00 am, which produces a slot value of one ("1") when inserted into the heuristic.

The program guide application 943 may utilize the determined slot value to identify a schedule index value that corresponds with the slot value in the schedule index array 1120. In this particular example, slot number one ("1") in the schedule index array 1120 has a schedule index value of two ("2").

The determined schedule index value can be used to identify associated data included in a schedule data array of the schedule file 830-1 (see Table 15). FIG. 11 illustrates a portion of an exemplary schedule data array 1130. In this particular example, a schedule index value of two ("2") corresponds with "schedule 2" in the schedule data array 1130. The schedule index value may be used to index the appropriate schedule data structure (Table 4) in the schedule data array 1130. In certain implementations, the schedule data array 1130 is pre-sorted by time and channel such as is shown in FIG. 11. Accordingly, the schedule index value can be used as a direct index into the schedule data array 1130. As shown in FIG. 11, "schedule 2" in the schedule data array 1130 corresponds with a 1:00 am start time for channel index zero ("0"), which corresponds with channel 2.

The program guide application 943 may retrieve any data included in the schedule data array 1130 that is associated with the identified schedule data structure (e.g., "Schedule 2"). Such data may include any of the data of Table 4. In this particular example, schedule information related to the scheduled broadcast of a program on channel 2 at 1:00 am may be retrieved from the corresponding schedule data structure included in the schedule data array 1130 of the schedule file 830-1.

The information included in the schedule data array 1130 may be sorted by channel indices and program start times, such as is illustrated in FIG. 11. This allows incremental data to be retrieved without having to repeat the above-described retrieval process. This can help reduce the processing demands associated with retrieving blocks of program guide data 944. For example, once "Schedule 2" data for a 1:00 am time slot has been identified in the schedule data array 1130 as described above, data for the subsequent time slot (e.g., a 2:00 am time slot) associated with the same channel index (e.g., channel index zero ("0")) may be retrieved by incrementing the schedule index value and using the incremented value to access the schedule data array 1130, which in the example being described would identify "schedule 3" in the schedule data array 1130. This capability can be especially beneficial for retrieval of blocks of information, including blocks of time (e.g., one and a half hour blocks) as may be included in a program guide user interface 1000.

The above-described retrieval process may be repeated for other channels and/or time slots. For example, schedule data for "channel 5" at a 12:00 am time slot may be retrieved by identifying the corresponding channel index ("1"), a slot in the schedule index array ([1]*24+0=24), the schedule index ("57"), and the corresponding schedule data structure ("Schedule 57") in the schedule data array 1130.

Once the appropriate schedule data structure has been retrieved, the program guide application 943 may retrieve detailed program information for one or more programs included in the schedule data. For example, for the identified schedule data structure in the schedule data array 1130, a corresponding program index included in the schedule data structure may be identified. The program index may comprise a program ID as described above (see Table 4). FIG. 12 illustrates the program indices and their values as they may be included the schedule data array 1130. By way of an example, "Schedule 1" of the schedule data array 1130 has a program index value of twenty-three ("23").

The identified program index value may be used as an index into one or more other data structures, including episode and show data structures such as those described above (e.g., see Tables 5 and 7). An exemplary episode data array 1240 of episode data structures and an exemplary show data array 1250 of show data structures are illustrated in FIG. 12.

The program guide application 943 may be configured to determine one or more appropriate data structures to access with the identified program index. For example, the program guide application 943 may be configured to determine whether to use the program index to index the episode data array 1240 or the show data array 1250. The determination may be based on one or more data flag values included in the identified schedule data structure. For example, the program guide application 943 may determine a value of an "IsEpisode" flag included in the schedule data structure. An example of an "IsEpisode" flag is depicted in Table 4.

When the value of an "IsEpisode" flag indicates that an associated program is an episode of a series, the program guide application 943 may use the program index value as an index for accessing data included in the episode data array 1240, which may include one or more episode data structures such as is depicted in Table 5. In the example shown in FIG. 12, when "Schedule 1" of the schedule data array 1230 is associated with an episode as indicated by an "IsEpisode" flag, the program guide index value ("23") associated with "Schedule 1" may be used to access element twenty-three ("23") of the episode data array 1240 for retrieval of detailed episode data. One or more offsets included in the identified element of the episode data array 1240 may be used to access data included in other data structures as described above. For example, an episode string offset such as is illustrated in Table 5 may be used to access Episode strings data (e.g., episode name and synopsis) in Table 6.

Information included in the episode data array 1240 may be used to identify and access series information that is related to an episode. For example, the episode data structure may include a series index for an episode. A series index may comprise a series ID, as described above. In FIG. 12, element twenty-three ("23") of the episode data array 1240 has a series index value of two ("2"). The series index can be used as an index to a series data array 1260 shown in FIG. 12. The series data array 1260 may include one or more series data structures such as that depicted in Table 9. In FIG. 12, the series index value of two ("2") is used to access element two ("2") of the series data array 1260, which includes series data for a television show know as M*A*S*H, which is indicative of a program being an episode of the M*A*S*H television series. As described above, the series data may include one or more offsets that can be used to access series string data (e.g., series name) in Table 10.

On the other hand, when the value of an "IsEpisode" flag in a schedule data structure of the schedule data array 1230 indicates that an associated program is not an episode of a series, the program guide application 943 may use the program index value of the schedule data structure as an index for accessing data included in the show data array 1250, which may include one or more show data structures such as that depicted by Table 7. In an example shown in FIG. 12, when "Schedule 150" of the schedule data array 1230 is associated with a show as indicated by an "IsEpisode" flag, the program guide index value ("23") associated with "Schedule 150" may be used to access element twenty-three ("23") of the show data array 1250 for retrieval of detailed show data. In FIG. 12, the identified show data in the show data array 1250 relates to a movie known as "The Mask."

Information included in the show data array 1250 may be used to identify and access detailed show information included in other data structures. For example, one or more offsets included in the identified show data structure (see Table 7) of the show data array 1250 may be used to access other data structures as described above. For example, a show string offset such as is illustrated in Table 7 may be used to access show strings data (e.g., show name and synopsis) in Table 8.

FIG. 13 illustrates exemplary data structures that may be accessed based on show information included in a show data structure such included in the show data array 1250. For example, the show data in the show data array 1250 may include a show string offset value of five hundred ("500"), which may be used as an index to an element in a show strings data structure such as show strings table 1360 illustrated in FIG. 13. By way of another example, the show data in the show data array 1250 may include an actor offset value of two hundred ("200"), which may be used as an index to an element in a credits data structure such as credits string table 1370. FIG. 13 illustrates another example in which the show data in the show data array 1350 may include an advisory index value of one ("1") and a genre index value of ("1"), each of which may be used as an index to a data array included in a lookup file 830, which may include content advisory and genre information as described above in relation to Table 13.

As mentioned above, the program guide application 943 may be configured to perform reverse lookup searches for program guide data 944. A reverse lookup search typically enables a user to find related broadcasts of a particular program or series, including future airings of a program or series, or airings of a program or series on various channels. For example, a user may be able to determine whether a program that the user wishes but is unable to view during a particular broadcast time is scheduled for broadcast at another time. Reverse lookup searches may be useful in the context of identifying programs to be recorded.

Figure 14:
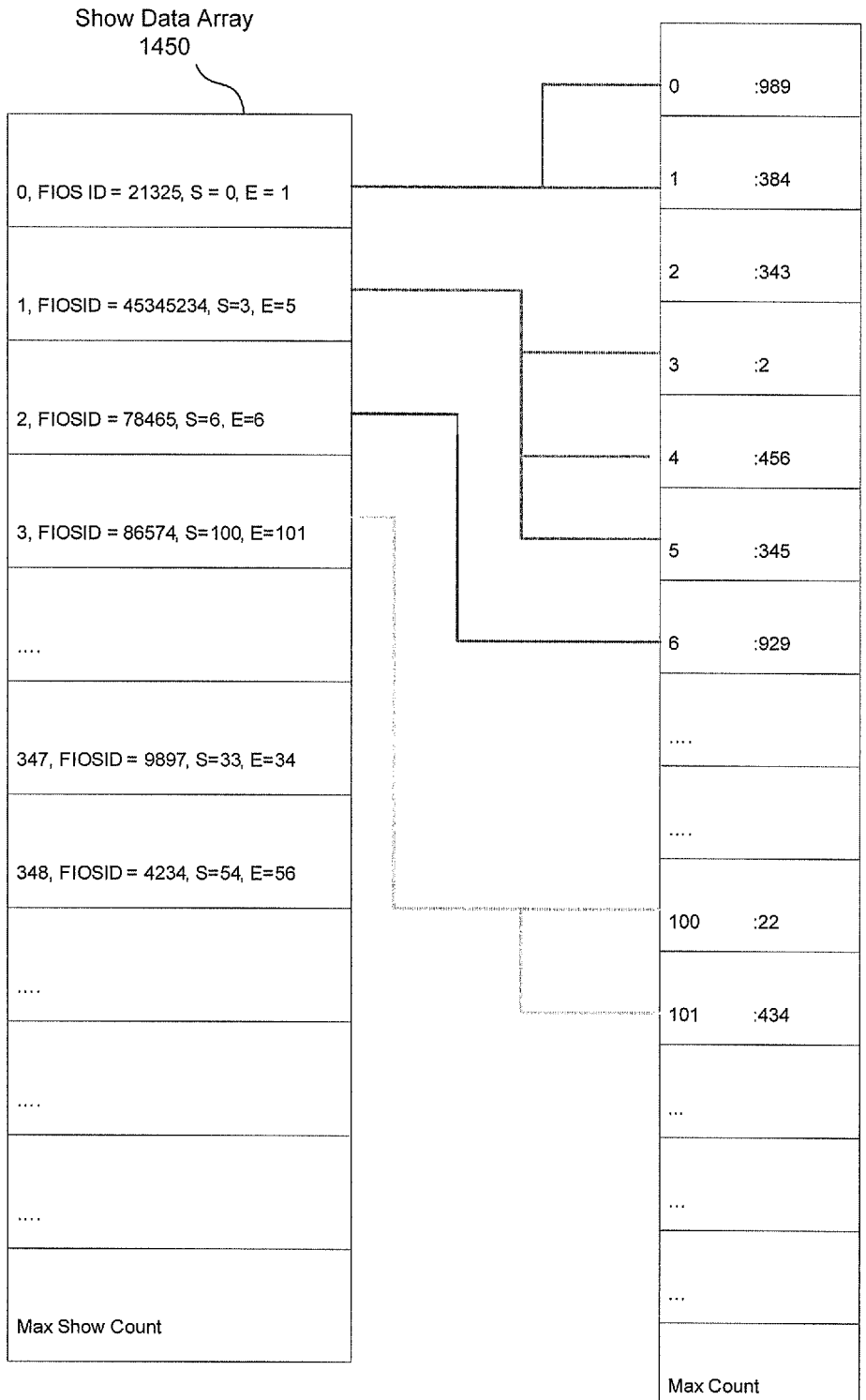
FIG. 14 illustrates a reverse lookup operation in relation to program guide data included in an optimized program guide data configuration.

FIG. 14 illustrates an exemplary reverse lookup of program guide data 944. The program guide application 943 may receive search parameters, including a program identifier (e.g., unique program ID) and/or a series identifier (e.g., unique series ID) associated with a particular program and/or series, respectively. The parameters may be obtained from user input, such as a user having selected or provided information for a particular program to be used as a basis for a reverse lookup search. The program and/or series identifier for the program may be used as the search parameter(s).

FIG. 14 illustrates an example of a reverse lookup based on a program ID for a particular show that may be represented in a show data structure such of an exemplary show data array 1450. The show data array 1450 may be included in schedule file 803 and may include one or more show data structures such as that depicted in Table 7. A search of the show data array 1450 may be performed to find the index associated with a program ID. As described above, in certain implementations, data in the show data array 1450 may be pre-sorted by program ID, and a binary search may be used to locate a particular program ID.

In a particular example, a program ID value of "45345234" may be used as a parameter for a reverse lookup search. A search of the show data array 1450 may reveal that this program ID value is associated with element one ("1") of the show data array 1450.

As described above, a show data structure may include index values that can be used for indexing elements included in a separate reverse lookup data structure, which may be included in a reverse lookup index array 1460 illustrated in FIG. 14. Such indices can facilitate efficient location of information in the reverse lookup index array 1460. For example, element one ("1") of the show data array 1450 is associated with program ID of "45345234" and includes a start index value of three ("3") and an end index value of five ("5"). These index values can be used to index data in the reverse lookup index array 1460. As shown in FIG. 14, the index values may identify elements three ("3") through five ("5") of the reverse lookup index array 1460. In the reverse lookup index array 1460, the values associated with elements three, four, and five of the array 1460 are two ("2"), four hundred fifty six ("456"), and three hundred forty five ("345"), respectively. These values can be associated with and used to identify schedule data structures in a schedule data array (e.g., schedule data array 1130) that correspond with broadcasts of the show having program ID "45345234." In certain implementations, the values can be used to directly index the schedule data array 1130, or another schedule data array in another schedule file 830, to locate schedule data for broadcasts of the show having program ID "45345234." For instance, schedule data structures two ("2"), four hundred fifty six ("456"), and three hundred forty five ("345") of the schedule data array 1130 may be associated with broadcasts of the show having program ID 45345234."

In the above-described manner, related broadcasts of a program or a series can be efficiently retrieved. The exemplary program guide data configuration described above generally ensures that reverse lookup operations can be performed with a worst case complexity of O(logN). O(logN) is a particular order of complexity for a software function to execute, as is well known. O(logN) complexity can be especially efficient for reverse lookup operations. For example, for certain conventional program guide data having data representative of approximately ten thousand ("10,000") programs, certain conventional program guide data applications would perform 10,000 iterations to determine related broadcasts of a program. For the same number of programs, the above-described exemplary, optimized program guide data configuration enables a reverse lookup search to be performed with a worst case of thirteen ("13") iterations.

The exemplary program guide data configuration described above may allow other data operations to be performed efficiently. For example, common data operations including common data retrievals can generally be performed with a worst case constant time complexity (i.e., a complexity of O(1)). Properties of the optimal data configuration described above, including Indexing between the various data structures in the data configuration, support this efficient level of complexity.

The preceding description has been presented only to illustrate and describe exemplary implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system comprising:
   a data preprocessor configured to receive raw program guide data, process the raw program guide data, and store the processed program guide data in a data store, the data preprocessor being configured to generate a unique program identifier for each program represented in the raw program guide data;
   wherein the data preprocessor comprises a data slicer that divides the processed program guide data by program date and stores the divided processed program guide data in discrete schedule files, each discrete schedule file storing twenty-four hours of program guide data aligned by program date;
   wherein the data preprocessor further:
   identifies a current day and determines that a current discrete schedule file among the discrete schedule files matches the current day;

caches the current discrete schedule file on the current day in response to determining that the current discrete schedule file matches the current day;

receives, on the current day, via a network, a plurality of requests from a plurality of client-side content processing subsystems for program guide data corresponding to the current day;

provides, on the current day, via the network, in response to each of the plurality of requests, the cached current discrete schedule file to each of the plurality of client-side content processing subsystems.

2. The system of claim 1, wherein the processing further includes identifying a unique series identifier for each series of program episodes represented in the raw program guide data, the data preprocessor being configured to generate each unique series identifier by generating a unique series string based on a predetermined set of data fields associated with the corresponding program, and using a predefined heuristic to generate the unique series identifier based on the unique series string.

3. The system of claim 1, wherein the data preprocessor is configured to generate each unique program identifier by generating a unique program string by concatenating data included in a predetermined set of data fields associated with the corresponding program and removing at least one pre-selected character from the concatenation, the at least one pre-selected character comprising at least one character that introduces undesired textual variations across a set of textual fields, each textual field within the set of textual fields individually representing the corresponding program, and using a predefined heuristic to generate the unique program identifier based on the unique program string.

4. The system of claim 3, wherein the data preprocessor is configured to repeatedly append a different extender to the unique program string and generate another unique program identifier until it is determined that the unique program identifier has not been assigned to another unique program string.

5. The system of claim 1, the data preprocessor further configured to generate a program guide data configuration from the processed program guide data, the program guide data configuration including program guide data organized into a plurality of data structures based on categories of the program guide data, the plurality of data structures including at least one channel data structure, at least one schedule data structure, at least one detailed program information data structure, and indices for use as references between different ones of the data structures.

6. The system of claim 5, wherein the program guide data configuration includes individually compressed program guide data strings configured for individual decompression.

7. The system of claim 5, wherein the program guide data configuration includes compressed program guide data strings and uncompressed program guide data strings, the uncompressed program guide data string being used more frequently than the compressed program guide data strings according to program guide data usage patterns.

8. The system of claim 5, wherein the at least one channel data structure includes a plurality of channel data structures, the at least one schedule data structure includes a plurality of schedule data structures, and the at least one detailed program information data structure includes a plurality of detailed program information data structures.

9. The system of claim 5, further comprising a network interface unit configured to provide at least a subset of the program guide data configuration to a content processing subsystem via the network.

10. The system of claim 5, wherein the data preprocessor comprises a data loader that is separate from the data slicer.

11. A system comprising:

a data preprocessor including a data loader configured to receive raw program guide data, process the raw program guide data, and store the processed program guide data in a data store, the data loader being configured to generate a unique program identifier for each program represented in the raw program guide data, wherein the data preprocessor is configured to generate each unique program identifier by generating a unique program string and using a predefined heuristic to generate the unique program identifier based on the unique program string; and the data preprocessor further including a data slicer configured to generate a program guide data configuration from the processed program guide data, the program guide data configuration including program guide data organized into a plurality of data structures based on categories of the program guide data, the plurality of data structures including at least one channel data structure, at least one schedule data structure, at least one detailed program information data structure, and indices for use as references between different ones of the data structures;

wherein the data slicer divides the processed program guide data by program date and stores the divided processed program guide data in discrete schedule files, each discrete schedule file storing twenty-four hours of program guide data aligned by program date;

wherein the data preprocessor further:

identifies a current day and determines that a current discrete schedule file among the discrete schedule files matches the current day;

caches the current discrete schedule file on the current day in response to determining that the current discrete schedule file matches the current day;

receives, on the current day, via a network, a plurality of requests from a plurality of client-side content processing subsystems for program guide data corresponding to the current day;

provides, on the current day, via the network, in response to each of the plurality of requests, the cached current discrete schedule file to each of the plurality of client-side content processing subsystems.

12. A method comprising:

receiving raw program guide data;

processing the raw program guide data, including assigning a unique program identifier for each program represented in the raw program guide data;

dividing the processed program guide data by program date and storing the divided processed program guide data in discrete schedule files, each discrete schedule file storing twenty-four hours of program guide data aligned by program date;

organizing the processed program guide data into a plurality of data structures based on one or more categories of the processed program guide data, wherein the plurality of data structures includes at least one channel data structure, at least one schedule data structure, and at least one detailed program information data structure;

identifying a current day and determining that a current discrete schedule file among the discrete schedule files matches the current day;

caching the current discrete schedule file on the current day in response to determining that the current discrete schedule file matches the current day;

receiving, on the current day, via a network, a plurality of requests from a plurality of client-side content processing subsystems for program guide data corresponding to the current day;

providing, on the current day, via the network, in response to each of the plurality of requests, the cached current discrete schedule file to each of the plurality of client-side content processing subsystems.

13. The method of claim 12, said organizing step including organizing string data included in the program guide data into at least one of the data structures separate from the program guide data stored in the other data structures.

14. The method of claim 12, further comprising:
individually compressing program guide data strings included in the program guide data; and
storing the compressed program guide data strings in the program guide data configuration, the compressed program guide data strings being configured for individual decompression.

15. The method of claim 12, further comprising selectively compressing a subset of program guide data strings included in the program guide data based on data representative of program guide data usage patterns, wherein the compressed program guide data strings are used more frequently than uncompressed program guide data strings in the program guide data usage patterns.

16. The method of claim 12, wherein the at least one channel data structure includes a plurality of channel data structures, the at least one schedule data structure includes a plurality of schedule data structures, and the at least one detailed program information data structure includes a plurality of detailed program information data structures, the method further comprising:
organizing the plurality of channel data structures into a channel file;
organizing a first subset of the plurality of detailed program information data structures into a lookup file storing detailed program information that is common between multiple programs represented in the program guide data; and
organizing the plurality of schedule data structures and another subset of the detailed program information data structures into at least one schedule file.

17. A method comprising:
receiving raw program guide data;
processing the raw program guide data, including assigning a unique program identifier for each program represented in the raw program guide data,
dividing the processed program guide data by program date and storing the divided processed program guide data in discrete schedule files, each discrete schedule file storing twenty-four hours of program guide data aligned by program date;
identifying a current day and determining that a current discrete schedule file among the discrete schedule files matches the current day;
caching the current discrete schedule file on the current day in response to determining that the current discrete schedule file matches the current day;
receiving, on the current day, via a network, a plurality of requests from a plurality of client-side content processing subsystems for program guide data corresponding to the current day;
providing, on the current day, via the network, in response to each of the plurality of requests, the cached current discrete schedule file to each of the plurality of client-side content processing subsystems.

18. The method of claim 17, further comprising:
determining whether the unique program identifier is already assigned to another unique program string; and
appending an extender to the unique program string and generating another unique program identifier based on the extended unique program string when it is determined that the unique program identifier is already assigned to another unique program string.

19. The method of claim 17, wherein said processing step further includes generating a unique service identifier for each station represented in the raw program guide data.

20. The method of claim 17, wherein said processing step further includes generating a unique series identifier for each series of program episodes by:
generating a unique series string based on a predetermined set of series data fields associated with the corresponding series; and
using a predefined heuristic to generate the unique series identifier based on the unique series string.

21. The method of claim 20, wherein said step of generating the unique series string includes:
concatenating data included in the predetermined set of data fields; and
removing at least one pre-selected character from the concatenation.

22. The system of claim 3, wherein the at least one pre-selected character comprises at least one of a space, a comma, an apostrophe, a period, an exclamation point, a question mark, a quotation mark, a hyphen, a dash, a parenthesis, a bracket, a slash, a colon, a semi-colon, an ampersand, and an ellipsis.

23. The system of claim 1, wherein the data preprocessor is configured to process the raw program guide data by storing the unique program identifier instead of at least one redundant copy of data representing the corresponding program.

24. The system of claim 11, wherein the data slicer is further configured to sort a data structure representing the corresponding program within the at least one detailed program information data structure by using the unique program identifier.

25. The system of claim 24, wherein the data preprocessor is configured to process the raw program guide data by storing the unique program identifier instead of at least one redundant copy of data representing the corresponding program.

26. The system of claim 3, wherein the generating the unique program string further comprises:
determining that the corresponding program comprises a sports program;
in response to determining that the corresponding program comprises a sports program, modifying the unique program string by appending an episode description of the sports program to the unique program string.

* * * * *